(12) United States Patent
Fesmire et al.

(10) Patent No.: US 10,656,109 B1
(45) Date of Patent: May 19, 2020

(54) CUP CRYOSTAT THERMAL CONDUCTIVITY ANALYZER

(71) Applicant: United States of America as Represented by the Administrator of the National Aeronautics and Space Administration, Washington, DC (US)

(72) Inventors: James E. Fesmire, Titusville, FL (US); Wesley L. Johnson, Middleburg Heights, OH (US); Jared P. Sass, Rockledge, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 196 days.

(21) Appl. No.: 15/603,393

(22) Filed: May 23, 2017

Related U.S. Application Data

(60) Continuation-in-part of application No. 14/199,768, filed on Mar. 6, 2014, now Pat. No. 9,678,025, which is a continuation-in-part of application No. 14/090,193, filed on Nov. 26, 2013, now Pat. No. 9,488,607, which is a division of application No.
(Continued)

(51) Int. Cl.
*G01N 25/18* (2006.01)
*G01K 17/00* (2006.01)

(52) U.S. Cl.
CPC .............. *G01N 25/18* (2013.01); *G01K 17/00* (2013.01)

(58) Field of Classification Search
CPC .............................. G01N 25/18; G01K 17/00
See application file for complete search history.

(56) References Cited

U.S. PATENT DOCUMENTS

| 1,943,194 A | 1/1934 | Vachoux |
| 2,995,330 A | 8/1961 | Alms |
| 3,782,128 A | 1/1974 | Hampton |
| (Continued) | | |

OTHER PUBLICATIONS

Lescarbeau, "Increasing Strength and Reliability of Interference Fits," Oct. 1, 2013, Assembly Magazine, pp. 1-78 (Year: 2013).*
(Continued)

*Primary Examiner* — Judy Nguyen
*Assistant Examiner* — Leo T Hinze
(74) *Attorney, Agent, or Firm* — Jonathan J. Leahy; Mark Homer

(57) ABSTRACT

A test apparatus for evaluating thermal properties of a test specimen across a wide range of thermal conductivities and temperature ranges using a flat plate cup cryostat. The test apparatus includes: a heater assembly having an upper surface to receive a test specimen; a cold plate positioned on top of the test specimen; a vessel comprising an outer cylindrical tube closed on a bottom end by the cold plate; an inner cylindrical tube concentrically received in an upper portion of the outer cylindrical tube above the vessel to vent the vessel; insulation material surrounding at least the heater assembly, test specimen, cold plate, and vessel; a sensor that detects boiloff or evaporation rate of liquid from the vessel vented from the inner cylindrical tube; temperature sensors positioned to detect temperatures of the heater assembly and the cold plate; and a data recording device to record the boiloff or evaporation rates and temperature values.

14 Claims, 33 Drawing Sheets

Related U.S. Application Data

12/813,864, filed on Jun. 11, 2010, now Pat. No. 8,628,238.

(60) Provisional application No. 62/340,349, filed on May 23, 2016, provisional application No. 61/775,003, filed on Mar. 8, 2013, provisional application No. 61/775,124, filed on Mar. 8, 2013, provisional application No. 61/186,475, filed on Jun. 12, 2009.

(56) References Cited

U.S. PATENT DOCUMENTS

| | | | |
|---|---|---|---|
| 3,830,663 | A | 8/1974 | Eisele et al. |
| 4,084,706 | A | 4/1978 | Russell |
| 4,350,017 | A | 9/1982 | Kneip |
| 4,484,823 | A | 11/1984 | Peuker |
| 4,762,423 | A | 8/1988 | Basta |
| 5,339,650 | A | 8/1994 | Hakamada |
| 5,484,204 | A | 1/1996 | Damley |
| 5,507,327 | A | 4/1996 | Ziegler |
| 5,758,785 | A | 6/1998 | Spinosa |
| 6,487,866 | B1 | 12/2002 | Fesmire |
| 6,742,926 | B1 * | 6/2004 | Fesmire .............. G01N 25/18 374/34 |
| 6,824,306 | B1 * | 11/2004 | Fesmire .............. G01N 25/18 374/34 |
| 7,540,656 | B1 | 6/2009 | Stochl et al. |
| 8,628,238 | B2 | 1/2014 | Fesmire et al. |
| 2006/0251145 | A1 | 11/2006 | Brushwyler |
| 2007/0153480 | A1 * | 7/2007 | Zhang .................. C09K 5/04 361/700 |
| 2007/0220904 | A1 | 9/2007 | Jibb |
| 2009/0092170 | A1 | 4/2009 | Brushwyler |
| 2009/0257843 | A1 | 10/2009 | Bentrim |
| 2014/0162882 | A1 * | 6/2014 | Graber .............. H02G 15/34 505/163 |

OTHER PUBLICATIONS

Scholtens, et al., "Cryogenic Thermal Performance Testing of Bulk-Fill and Aerogel Insulation Materials," Advances in Cryogenic Engineering: Transactions of the Cryogenic Engineering Conference—CEC, vol. 52. AIP Conference Proceedings, vol. 985, pp. 152-159 (2008).

Fesmire, et al., "Thermal Performance Testing of Cryogenic Insulation Systems," International Thermal Conductivity Conference 29, Birmingham, AL USA Jun. 2007.

Fesmire, et al., "Equipment and Methods for Cryogenic Thermal Insulation Testing," Advances in Cryogenic Engeineering: Transactions of the Cryogenic Engineering Conference—CEC. AIP Conference Proceedings, vol. 710, pp. 579-586 (2004).

Fesmire and Augustynowicz, "Insulation Testing Using Cryostat Apparatus With Sleeve," Advances in Cryogenic Engineering (2000), 45 1683-1690.

Swagelok, "Bellows-Sealed Valves," Nov 2002. Retrieved from: http://hepunx.rl.ac.uk/BFROOT/www/Detector/IFR/llnl/gasmixer/hardware/shutoff_valves1.pdf.

QMC Instruments Ltd., "Cooled InSb Bolometer System Operating Manual," Model QFI/3, Mar. 24, 2005.

* cited by examiner

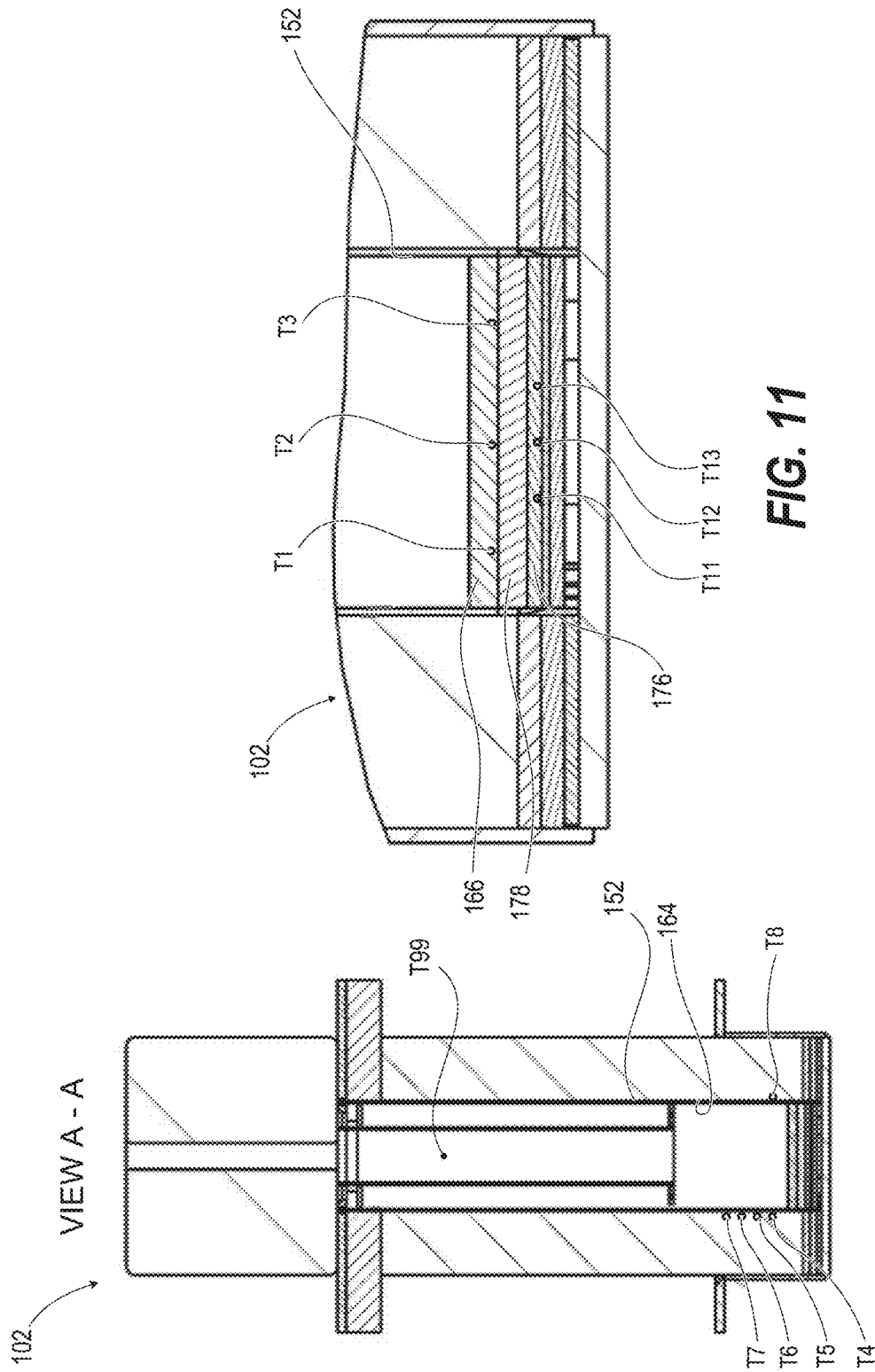

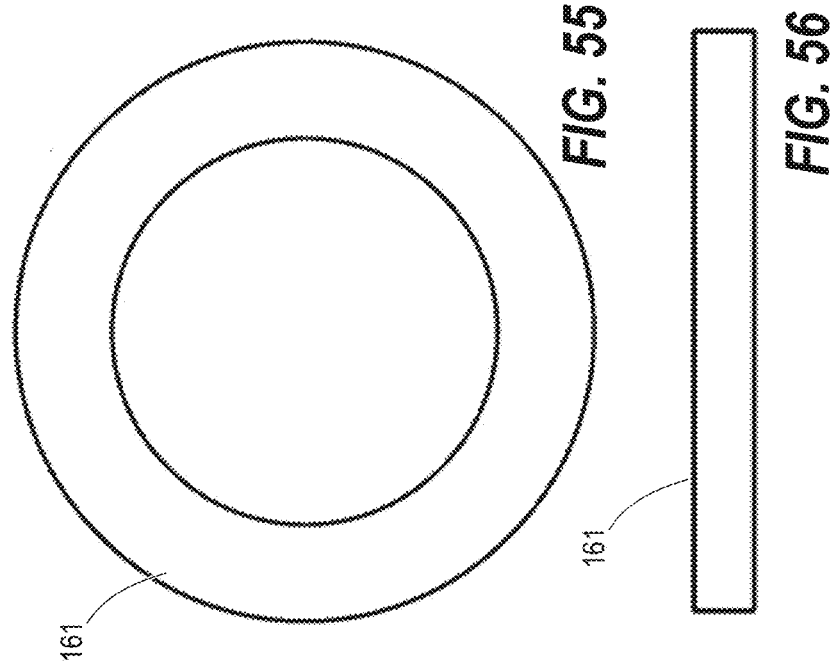
FIG. 55
FIG. 56
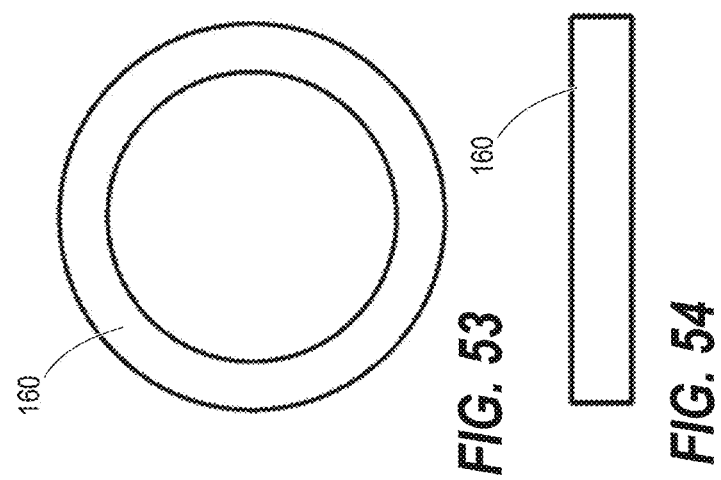
FIG. 53
FIG. 54

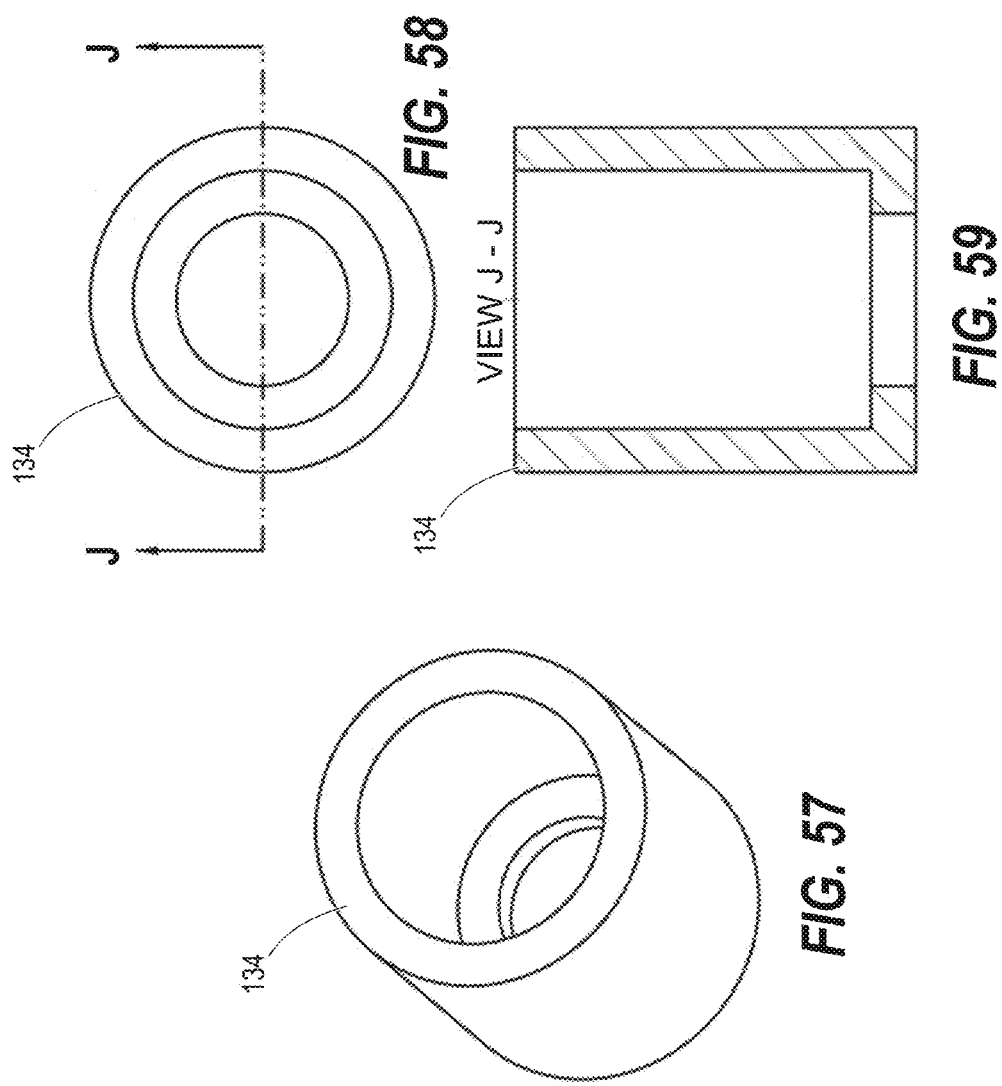

FIG. 61

Note: sensor numbers (e.g., T1, T2, etc.) in this figure do not correspond to sensor numbers in any other figure.

CUP CRYOSTAT THERMAL CONDUCTIVITY ANALYZER

CROSS-REFERENCE TO RELATED APPLICATIONS

This application claims the benefit of priority under 35 U.S.C. § 119(e) to U.S. Provisional Application Ser. No. 62/340,349 entitled "Macroflash (Cup Cryostat) Thermal Conductivity Analyzer," filed on May 23, 2016, the contents of which are incorporated herein by reference in their entirety. This application is a continuation-in-part of U.S. patent application Ser. No. 14/199,768 filed on Mar. 6, 2014, which claims the benefit of priority under 35 U.S.C. § 119(e) to U.S. Provisional Application Ser. No. 61/775,003 entitled "Guarded Flat Plate Insulation Test Apparatus (Cryostat-500)" and to U.S. Provisional Application Ser. No. 61/775,124 entitled "Guarded Two Dimensional Flat Plate Calorimeter (Cryostat-600)" both filed on Mar. 8, 2013, which is also a continuation-in-part of U.S. patent application Ser. No. 14/090,193, filed on Nov. 26, 2013, which issued as U.S. Pat. No. 9,488,607 on Nov. 8, 2016, which in turn is a divisional application of U.S. patent application Ser. No. 12/813,864 filed on Jun. 11, 2010, which issued as U.S. Pat. No. 8,628,238 on Jan. 14, 2014, and which further claims the benefit of priority under 35 U.S.C. § 119(e) to U.S. Provisional Application Ser. No. 61/186,475 filed Jun. 12, 2009, the contents of which are incorporated herein by reference.

ORIGIN OF THE INVENTION

The invention described herein was made by employees of the United States Government and may be manufactured and used by or for the Government of the United States of America for governmental purposes without the payment of any royalties thereon or therefore.

BACKGROUND OF THE INVENTION

Technical Field

The present invention generally relates to a testing apparatus and methods of making precise thermal performance (including thermal conductivity) measurements of material specimens and, more specifically, to testing specimens across a wide range of temperatures, with or without compressive loading applied, and for a wide range of different types and forms of materials and composite systems; both homogeneous (uniform) and isotropic (non-directional); and non-homogeneous (non-uniform) and anisotropic (directional); as well as any combination thereof.

Description of the Related Art

In today's world of increasing demand for multifunctional materials as well as increasing demands for energy and energy efficiency, complete and accurate thermal characterization of materials (e.g., thermal performance attributes of the material such as thermal conductivity and heat flux) is critical. It is a key aspect in designing efficient and effective structures, goods, and systems. Advances in new polymers and composites, powders, aerogels, ceramics, carbon fiber, metal alloys, semiconductors, glasses, fiberglass, etc., along with growing industrial needs in below-ambient temperature applications, have brought about the development of the present invention. New advances, applications, and architectural approaches in materials engineering are requiring the use of structural systems combining insulators and conductors, thermal-structural composites, highly directional (anisotropic), and/or non-homogeneous materials, or layered stack-ups of composites. Accurate thermal performance information, including effective thermal conductivity data, are needed under relevant end-use conditions. The present invention is a practical tool for basic testing of common materials or research evaluation of advanced materials/systems. The instrument can test solids, foams, or powders that are homogeneous or layered in composition. A common test specimen size is approximately 76 mm in diameter and from 3 mm to 12 mm in thickness, but smaller or larger specimens can be tested with appropriately scaled designs. For a 76 mm diameter specimen size, any thickness up to about 15 mm can be readily tested (i.e., diameter to thickness (d/t) ratio of greater than or equal to approximately 5). The cold side is maintained by a below-ambient temperature boiloff fluid such as liquid nitrogen at 77 K while a heater disk maintains a steady warm-side temperature from ambient up to 373 K or higher. The steady boiloff of the liquid provides a direct measure of the heat energy transferred through the thickness of the test specimen. Different compression loading levels can also be conveniently applied to the test specimen as needed for accurate, field-representative thermal performance data. The instrument is calibrated from approximately 10 mW/m-K to 800 mW/m-K using well-characterized reference materials.

The present invention follows the guidelines of the newly established technical standard ASTM C1774, and provides a cost-effective, field representative methodology to test any material for moderately elevated to below-ambient temperature applications. From engineered systems, to research testing, to quality control in manufacturing, the technology provides utility for the fields of energy, transportation, construction, and environment. The invention provides a practical apparatus and method for measuring thermal performance of materials and especially at below-ambient temperatures or being subjected to a large temperature difference, but not limited to such conditions. One embodiment uses liquid nitrogen as a direct-heat energy meter and is applicable to testing under an ambient pressure environment at a wide range of temperatures, from 373 K down to 77 K. The invention can be adapted for use with other boiloff fluids such as the refrigerant HFC-245fa with a normal boiling point of 287 K for higher temperature range testing.

The inherent nature of the invention, using a direct measure of the heat flow rate, makes possible the testing of materials/systems going beyond the limitations of the state of the art instruments in the world today. The only known way to directly measure heat flow is by a phase change of a known substance with a known thermodynamic property of enthalpy such as heat of vaporization or heat of fusion. Indirect heat flow measurements (using electrical power coupled with temperature sensors) include the ubiquitous Heat Flux Meter (ASTM C518 and ISO 8301) and Guarded Hot Plate (ASTM C177 and ISO 8302) which are generally limited to isotropic, homogeneous materials. The Heat Flux Meter type is further limited to small temperature differences, a narrower temperature range, and a narrower heat measurement range. The present invention can test at large or small temperature differences because the heat flow rate is steady-state and the measurement by the boiloff fluid is a direct measure of heat flow. Therefore, the invention is also used to obtain multiple data points from a single test by applying optional internal temperature sensors. From one test, a plot of thermal conductivity (lambda) as a function of mean temperature can be obtained as well as the effective thermal conductivity ($k_e$) of the total system under the condition of a large temperature difference.

One valuable technique for testing the thermal performance of materials is evaporation or boiloff testing. Boiloff testing is accomplished by filling a vessel with a fluid which evaporates or boils below ambient temperature. In the general sense, boiling is associated with higher heat transfer rates and evaporation with lower heat transfer rates. The phase change of a known fluid, from liquid to gas, with a known heat of vaporization provides the fundamental means for the measurement of the flow rate of heat (the "energy going" from the hotter side of a test specimen to the cooler side). Although the exemplary fluid is the cryogen liquid nitrogen, other fluids such as liquid helium, liquid methane, liquid hydrogen, alcohols, water, or known refrigerants such as HCFC 245fa may be used. For example, other liquids that can be used include 20 K (liquid hydrogen), 4 K (liquid helium), 216 K (carbon dioxide), 246 K (Freon R134a), 351 K (ethyl alcohol), and other known refrigerants with suitable boiling points and latent heats of vaporization. A vessel (cup) is place below the test specimen material and then filled with the boiloff test fluid such as a cryogenic liquid. A calorimetry method is then used to determine the thermal conductivity of the test material by first determining the rate of heat passing through the test material to the vessel containing the refrigerant liquid. The heat leakage rate passing through the test material to the liquid in the vessel is directly proportional to the liquid boiloff rate from the vessel. For a test material under a set gaseous environment and a pre-determined compressive loading, the effective thermal conductivity ($k_e$) and/or heat flux (q) is determined by measuring the boiloff flow rate at prescribed warm boundary temperature (WBT) and cold boundary temperature (CBT) across the thickness of the specimen.

Both cylindrical and flat-plate cryostats have been standardized for laboratory operation. Although cylindrical configurations are better at minimizing unwanted lateral heat transfer, flat-plate configurations offer a number of potential advantages regarding the test specimens, including (1) the ability to handle small test specimens (when only a small piece can be obtained), (2) compression loading capability, (3) specialized ambient pressure testing with different purge gases, and (4) greater relevance to end-use application. Powder-type insulation testing has also been done successfully with the present invention. The flat-plate cryostats are also easier to adjust for different cold boundary temperature (CBT) settings by the placement of an intermediary material on the cold-side surface. In this way, materials can be tested for a wide range of different mean temperatures or for a large temperature difference. Heat flows in accordance with the temperature difference, not the temperature, making the direct heat measurement capability of the boiloff instrument a highly versatile and practical tool for research or commerce.

In a prior Cryostat 400 flat plate type comparative testing system of the applicant, a test apparatus and method of its use for evaluating various performance aspects of a test specimen is disclosed in U.S. Pat. No. 6,824,306, the disclosure of which is hereby incorporated by reference in its entirety. A chamber within a housing contains a cold mass tank with a contact surface in contact with a first surface of a test specimen. The first surface of the test specimen is spaced from the second surface of the test specimen by a thickness. The second surface of the test specimen is maintained at a desired warm temperature. The first surface is maintained at a constant temperature by a liquid disposed within the cold mass tank. A boiloff flow rate of the gas is monitored and provided to a processor along with the temperature of the first and second surfaces of the test specimen. The processor calculates thermal insulation values of the test specimen including comparative values for heat flux (q) and effective thermal conductivity ($k_e$). The test specimen may be placed in any vacuum pressure level ranging from about 0.01 millitorr to 1,000,000 millitorr with different residual gases as desired. The test specimen may be placed under a mechanical load with the cold mass tank and another factors may be imposed upon the test specimen so as to simulate the actual use conditions. While a highly useful test instrument, Cryostat 400 required full vacuum range testing of large disc-shaped solid specimens of 203 mm diameter and up to 40 mm thick with a heat flux testing range of 4-400 W/m$^2$ (or $k_e$ from about 1 mW/m-K to 50 mW/m-K).

Commercial instruments for thermal conductivity testing of materials do not directly measure heat flow but instead often rely on indirect analysis using critical temperature sensors in combination with electrical power usage. Others like laser-flash methods, apply pulses of light and thereby infer heat flow, in a transient manner, from the time-dependent temperature response. These laser-based transient methods are generally limited to isotropic, homogeneous materials with thermal conductivities above 100 mW/m-K, a threshold well above all common thermal insulation materials. Another generally-known flat plate tester is Anter Q10 Thermal Analyzer (now TA Instruments DTC-25) that measures thermal conductivity according to the ASTM E1530 guarded heat flow meter method. In this equipment, a small sample of the material to be tested is held under a compressive load between two polished metal surfaces, each controlled at a different temperature. The Anter Q10 instrument, and the similar commercial instruments, is limited to the testing of materials with a thermal conductivity above 100 mW/m-K and a specific thickness in a narrow range. That is, the thermal resistance must be in a certain, limited range or a heat measurement is not possible. Thus, most thermal insulation materials and other low-density materials cannot be tested with this instrument. The materials must also be isotropic and homogeneous for accurate results, which imposes another drastic limitation. This limitation is due to the fact that the measurement being made is indirect with significant internal calculations, analytical correlations, and calibrations required to determine thermal conductivity, which often dictates a narrow range of heat flow measurement capability. Testing is further limited to small temperature difference (small delta-T) conditions which are often not an accurate representation of the real world, actual-use condition.

SUMMARY OF THE INVENTION

In one aspect, the present disclosure provides a test apparatus for evaluating thermal properties of a test specimen. The test apparatus includes a base comprised of lateral base enclosure closed along a bottom edge by a base plate. The cup includes at least one radially and outwardly extending structure attached to the lateral enclosure to present at least three bottom annularly spaced attachment points. The test apparatus includes a top plate having a central aperture and at least three top annularly spaced attachment points that correspond respectively to the at least three bottom annularly spaced attachment points of at least one radially and outwardly extending structure of the base cup. The test apparatus includes a compression assembly comprising a plurality of longitudinally-adjustable, elongated members.

Each member is attachable respectively between a corresponding pair of top and bottom annularly spaced attachment points. The test apparatus includes a first tube having an open top that engages a lower surface of the top plate and a lower end sealed by a plate to define a vessel to receive a quantity of liquid. The test apparatus includes a specimen holder placed on the base that annularly corresponds to the first tube. The test apparatus includes a heater assembly supported on the bottom of the base. The heater assembly is positioned below and spaced apart from the plate defining a test specimen cavity having a variable height that is set by the compression assembly. The test apparatus includes a cup wrap that laterally surrounds and insulates the first tube. The test apparatus includes one or more annular thermally insulative compression rings placed in the base to correspond to and compressibly receive an underside of the cup wrap. A number of the one or more annular thermally insulative compression rings is selectable to correspond to the variable height of a given test specimen.

In another aspect, the present disclosure provides a test apparatus for evaluating thermal properties of a test specimen. In one or more embodiments, the test apparatus includes a heater assembly having an upper surface to receive a test specimen. The test apparatus includes a cold plate positioned on top of the test specimen and having a horizontal diameter value "D". The test apparatus includes a vessel having an outer cylindrical tube closed on a bottom end by the cold plate. The test apparatus includes an inner cylindrical tube concentrically received in an upper portion of the outer cylindrical tube above the vessel to vent the vessel, wherein the vessel has a height of at least 40% of D. The cold plate diameter, the heater plate diameter, and the diameter of the test specimen between the two are all approximately the same diameter and in excellent lateral alignment (minimal offset). The test apparatus includes insulation material surrounding at least the heater assembly, test specimen, cold plate, and vessel. The test apparatus includes a sensor that detects boiloff rate of liquid from the vessel vented from the inner cylindrical tube. The test apparatus includes a plurality of temperature sensors positioned to detect: (i) a temperature of the heater assembly and (ii) a temperature of the cold plate. The cold plate temperature sensor is optional: it is not needed for the thermal conductivity calculation but is however useful in operational aspects. A given boiloff fluid has a known value for its Normal Boiling Point (NBP) temperature which is sufficient for calculation and reporting of the thermal test result. Additional temperature sensors can be placed on the surface of the test specimen, within the specimen, or between the layers of a layered-type specimen. In this way, multiple thermal conductivity values can be computed for a single test run as the heat flow is steady-state and constant through the entire thickness and all layers of the specimen. The test apparatus includes a data recording device in communication with the sensor and the plurality of temperature sensors to record the selected one of the weight and the flow rate and temperature values received from the plurality of temperature sensors as a volume of liquid in the vessel changes from about 15% of D to about 40% of D.

The above summary contains simplifications, generalizations, and omissions of detail and is not intended as a comprehensive description of the claimed subject matter but, rather, is to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 10 illustrates a side view of the cup cryostat of FIG. 4 cutaway along lines A-A annotated for thermocouples, according to one or more embodiments;

FIG. 11 illustrates a detail view of the cup cryostat of FIG. 10, according to one or more embodiments;

FIG. 53 illustrates a top view of an inner cryosponge ring of the cup cryostat of FIG. 1A, according to one or more embodiments;

FIG. 54 illustrates a side view of the inner cryosponge ring of FIG. 53, according to one or more embodiments;

FIG. 55 illustrates a top view of an outer cryosponge ring of the cup cryostat of FIG. 1A, according to one or more embodiments;

FIG. 56 illustrates a side view of the outer cryosponge ring of FIG. 55, according to one or more embodiments;

FIG. 57 illustrates an isometric view of a spring housing of the cup cryostat of FIG. 1A, according to one or more embodiments;

FIG. 58 illustrates a top view of the spring housing of FIG. 57, according to one or more embodiments;

FIG. 59 illustrates a side view of the spring housing of FIG. 58 cutaway along line J-J, according to one or more embodiments;

FIG. 61 illustrates a graphical table of a calibration data of the testing system of FIG. 1A, according to one or more embodiments;

DETAILED DESCRIPTION OF THE INVENTION

Figure 1A:
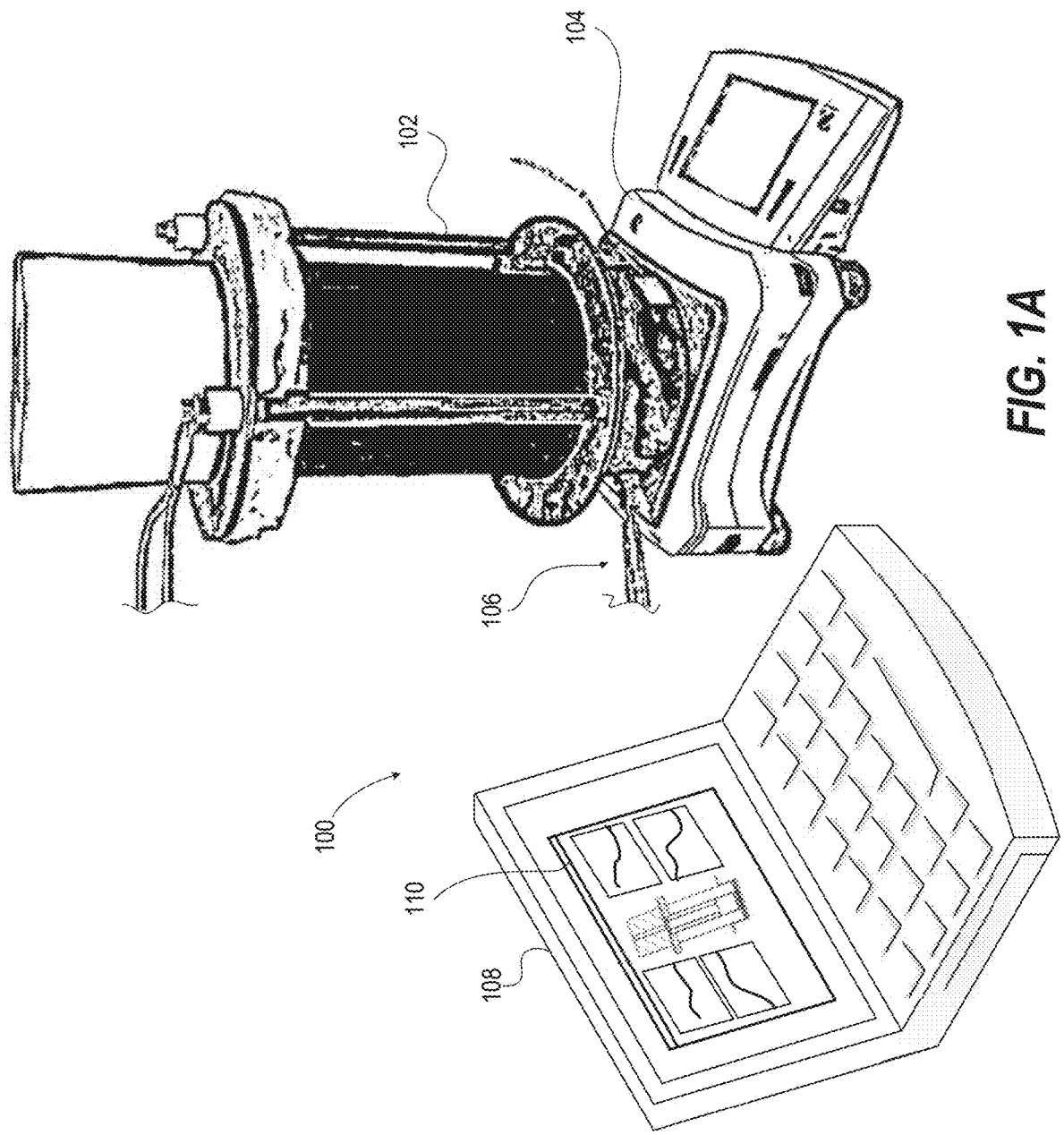
FIG. 1A illustrates an isometric view of a testing system including a cup cryostat, according to one or more embodiments.

A cup cryostat calorimeter ("Macroflash") is a flat-plate liquid nitrogen boiloff calorimeter that tests at a large temperature difference (large delta-T) and/or at a small temperature difference (small delta-T) and provides effective thermal conductivity ($k_e$) data and/or thermal conductivity (lambda) for a wide range of materials from foam insulations to aerogels to layered composites to carbon fiber composites according to guidance set forth in ASTM C1774. Ability to use liquid nitrogen as a liquid, for example, provides a large delta-T from which smaller delta-T tests can be obtained. Boiloff testing technology coupled with the technical standard provides a cost-effective, field-representative methodology to test any material or system for applications at below-ambient to cryogenic temperatures. Such standards for testing and data have a strong correlation to energy, transportation, and environment and the advancement of new materials technologies in these areas. Macroflash is not just for testing low temperatures. Rather, the method uses the low temperature liquid nitrogen as a direct heat energy meter and is applicable to testing at a wide range of temperatures from about 373 K down to 77 K. Macroflash utilizes generic Labview software to display temperatures and the weight scale. A graphical display is provided of the temperatures and real-time calculators of the thermal performance data including effective thermal conductivity ($k_e$), heat flux (q), and boiloff mass flow rate (g/s).

The Macroflash makes one measurement: boiloff rate, by either gas flow rate and/or weight loss. Boiloff rate is a measure of the thermal energy (heat) going through the thickness of the test specimen. The boiloff rate is directly proportional to the heat flow rate=rate of heat transmission=rate of heat transfer=etc. Therefore, boiloff rate and heat flow rate can be considered synonymously. With this direct measure of heat flow rate (Q in joules/second=watts=horsepower=etc.), it is then easy to calculate heat flux (q in W/m2), and thermal conductivity (k in mW/m-K). In a given test, different thermal conductivities can be calculated such as $k_a$ as well as the usual $k_e$ depending on the requirements and the placement of temperature sensors, providing test versatility.

Macroflash cup cryostat is for all types of materials of which insulation materials are only a minor part. Boiloff liquids that can be used in Macroflash are liquid nitrogen (LN2), chlorofluorocarbon (HCFC), 245fa (14° C.), and even water (100° C.). Depending on the test conditions and material specifications, the Macroflash can be used to test and calculate for four different thermal conductivity values: lambda, $k_a$, $k_e$, and $k_s$. Lambda is for a "perfect" isotropic, homogeneous material at a small delta-T, such as a piece of glass. The $k_a$ is for small delta-T for a multi-mode heat transfer for a uniform single material, such as a piece of foam rubber. The $k_e$ is for a large delta-T and multi-mode such as aerogel blanket layers with reflective layers between or such as that same piece of foam. Significantly, Macroflash tests for $k_e$ by being able to test uniform single materials and complex composites and layered systems as outlined in standard ASTM C1774. The $k_s$ is similar to $k_e$ but for a total system such as a multilayer insulated roofing system with the nails or fasteners included or any of an infinite range of different systems. To enable such diverse testing capabilities, Macroflash: (1) performs a direct heat measurement and (2) has a large delta-T to work with. This large delta-T can be virtually divided into smaller delta-Ts, all in the same test, by inserting temperature sensors within the test specimen across its thickness in the heat flow direction. Thus in one test, a whole series of lambdas as well as the $k_e$ (or $k_a$ or $k_s$) can be computed.

Macroflash provides a useful testing capability within a family of flat-plate cryogenic calorimeter testing systems. Four types of cryostat instruments for the testing of thermal insulation systems in a flat plate configuration have been developed and standardized for laboratory operation. The measurement principle is boiloff calorimetry for determining effective thermal conductivity ($k_e$) and heat flux (q) of a test specimen under a wide range of real-world conditions. (i) Cryostat-500, for 8-inch diameter test specimens, is thermally guarded (by separate cryogen chamber) to provide absolute thermal performance data when properly calibrated with a known reference material; (ii) Cryostat-600 (larger size, for 12-inch diameter test specimens) includes a structural element option (for example, multilayer insulation (MLI)+struts); (iii) Cryostat-400, for 8-inch diameter test specimens, is a comparative type instrument without a separate cryogen guard chamber; and (iv) The Macroflash (Cup Cryostat) is bench-top size comparative instrument for thermal conductivity testing of materials from aerogel insulation to carbon composites in ambient pressure environments (no vacuum). The applicable testing ranges are summarized in TABLE 1.

TABLE 1

| Instrument | Type | Test Specimen Size | ASTM Test Standard | Environment | Heat Flux (W/m²) |
| --- | --- | --- | --- | --- | --- |
| Cryostat-500 | Absolute | 203 mm diameter, up to 40 mm thick | C1774 Annex A3 | Full range vacuum, 77 K-353 K | 0.4-400 |
| Cryostat-600 | Absolute w/structural element option | 305 mm diameter, up to any thickness | C1774 Annex A3 | Full range vacuum, 77 K-353 K | 0.4-400 |
| Cryostat-400 (U.S. Pat. No. 6,824,306) | Comparative | 203 mm diameter, up to 40 mm thick | C1774 Annex A4 | Full range vacuum, 77 K-353 K | 4-400 |
| Macroflash Cup Cryostat | Comparative | 76 mm diameter, up to 7 mm thick | C1774 Annex A4 | No vacuum, 77 K-373 K | 80-1000+ |

Among flat-plate cryostats, Macroflash cup cryostat in particular has been proven to several desirable attributes: (1) simplicity/economy of running tests, (2) ability to test a wide range of different materials, from high performance aerogel insulators to structural materials to bricks made of simulated Mars regolith to bulk-fill glass microspheres to roofing material asphalts, etc., that can be readily managed, and (3) successful calibration of the instrument for the range of about 10 to 800 mW/m-K. Customized LabView software handles data tabulation, analysis, and report in a single screen view with Excel data file for back-up or more detailed analysis later.

The test method is comparative and therefore requires calibration with materials of known thermal conductivity data. Some example test conditions are representative of actual-use cryogenic applications with boundary temperatures of approximately 293 K and 78 K. The test measurement principle is liquid nitrogen boiloff calorimetry where the mass flow rate of nitrogen gas is directly related to the rate of heat energy transmitted through the material. The test specimens are typically 6 mm (¼") thick by 76 mm (3") diameter and should be flat and smooth-faced or be easily compressible to ensure good thermal contact between the heater assembly and the cold mass. The thickness can be from about 1 mm to 15 mm for a 76 mm diameter design; the diameter to thickness (d/t) ratio is about 5 or more. All tests are performed at the ambient pressure (no vacuum) environment. Thin sheets of materials can be assembled to make a stack. Both sides should be flat and smooth, especially with respect to the side of the specimen placed against the cold mass. Thermal grease is preferably used on all surfaces of hard, rigid materials and some level of compressive load, such as a 5 psi setting, is applied under the stabilized cold condition. For compliant materials like spray foam insulation, thermal grease is not used and a compressive load of 2 psi is applied. The Macroflash can also be used to test powder type materials with its custom design specimen ring holder assembly. A key operating feature of the Macroflash is that the spring loading system design allows for the maintaining of a constant compression no matter the temperature condition or change in temperature and the resulting thermal expansion/contraction of the cup assembly of the apparatus.

The Macroflash can test materials from foams to powders; from homogeneous, isotropic materials to highly anisotropic, layered composites; from aerogel super insulators to plastics, glasses, or even metals across a wide range of thermal conductivity and heat flux. Repeatability is typically better than 1% and accuracy better than 5%. These data have been demonstrated through tests of hundreds of different materials and thermal insulation systems. Repeatability of approximately 0.1% is not uncommon for a typical series of test runs.

According to the present invention, these features were developed: First, a compression loading system that places a test specimen under a constant contact (compressive) load during testing. The load should be constant through all phases of the testing procedure: installation, cool down, boiloff testing, and warm-up (that is, built-in compliance to allow for thermal expansion/contraction). Each of the three loading rods are equipped with a spring device located above the top plate. The compression load targets are listed as follows: <0.5 psi (settling load only), 2 psi, and 5 psi (or as otherwise designated). Different settings can be achieved by changing out springs or by further mechanical adjustment.

Second, the cold plate assembly is made from copper with temperature sensors added in three locations about the perimeter of the cold plate. The copper cold plate provides improved thermal stability and operational visibility for control. Thermal analysis of the horizontal isotherms of the measurement region (comparison of aluminum or stainless steel versus copper) shows the advantage of the increased thermal mass and the improved thermal response during operation.

Third, in addition to the three cold plate temperature sensors, five (5) temperature sensors (Type E, 30-gauge thermocouples) are added to the cold chamber (cup) of the system in strategic locations according to prior experience and bench top experiments to provide liquid level information inside the "cup" to facilitate ease of operation and system reliability.

Fourth, a concentric tube assembly including a concentric G-10 fiberglass epoxy ("G10") tube is placed inside cup. The concentric tube is 2.00" outer diameter (OD) and extends from the lower region of the cup to slightly above loading flange (top plate). The purpose of the additional tube is two-fold: (a) provide a sealed port for flow meter attachment and (b) provide a ~50% reduction in the annular volume of the cup to reduce convective heat transfer during higher heat flux tests. The concentric tube allows safe and convenient liquid nitrogen (LN2) filling of the cup by pouring as a standard practice. The concentric tube has a recess between it and the outer tube; this recess is filled with an open-cell polyimide foam ring to fill the void. This foam ring (Solimide AC-550 or equivalent, 0.5 pounds per cubic foot) acts to soak up any excess or small spill of liquid nitrogen during the normal filling or replenishing operation of pouring into the instrument. The concentric tube assembly, including an upper spacer ring and lower spacer ring to hold an insulation material, may be comprised of a glass fiber reinforced composite material for high mechanical strength and low thermal conductivity in all directions. The upper spacer ring and lower spacer ring are affixed using an epoxy adhesive to the outer diameter of the inner tube and the inner diameter of the outer tube. This forms an annular cavity for inclusion of additional insulation material. In addition, for thermal shock resistance the cold plate can be hermetically sealed to the concentric tube assembly using an epoxy adhesive and an interference fit wherein the test apparatus is resistant to thermal shocks between temperatures of −321 degrees F. and 300 degrees F.

Fifth, a foam cap assembly is used. The foam cap can extend to the bottom of the concentric tube to fill the volume and minimize any convection heat transfer within the tube. The foam cap is not used when the flow meter operation is employed as any cold vapors are routed away from the apparatus through the flexible plastic tube connecting to a flow meter.

Sixth, a flow meter adapter assembly seals inside the concentric tube. The upper end of the adapter is 0.375-inch OD by 1.5-inch length plain stainless steel (SST) tube end. The given volumetric flow meter can be attached via Tygon tube and hose clamp, as standard practice. The adapter can be easily and conveniently removable to facilitate LN2 filling and refilling of the cup.

Seventh, a warm-up heater is provided by a Kapton thin film heater affixed to the lower end of the cold cup. The warm-up heater provides a safe, quick turnaround for the next test specimen. The method of incorporation of the heater in the assembly design does not have any thermal effect on the testing or procedure. The lead wires are safely and conveniently routed from the assembly underneath the aerogel blanket wrap layers.

In the following detailed description of exemplary embodiments of the invention, specific exemplary embodiments in which the invention may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present invention. It is also to be understood that other embodiments may be utilized and that logical, architectural, programmatic, mechanical, electrical, and other changes may be made without departing from general scope of the invention. The following detailed description is, therefore, not to be taken in a limiting sense, and the scope of the present invention is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific components, device and/or parameter names, and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods, and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1A illustrates a testing system 100 that includes a cup cryostat ("Macroflash") 102 placed upon a digital scale 104. Sensor cables 106 extending from the cup cryostat 102 and weight measurements from the digital scale 104 provide data to a personal computer (PC) 108 that executes a customized Labview software that presents a graphical user interface (GUI) 110 to tabulate and display test results. The cup cryostat 102 addresses testing of the widest possible range of different materials, yet facilitates a simple testing procedure for the operator. In one or more embodiments, a cup cryostat can provide for more simplification by narrowing a testing range.

Figure 1B:
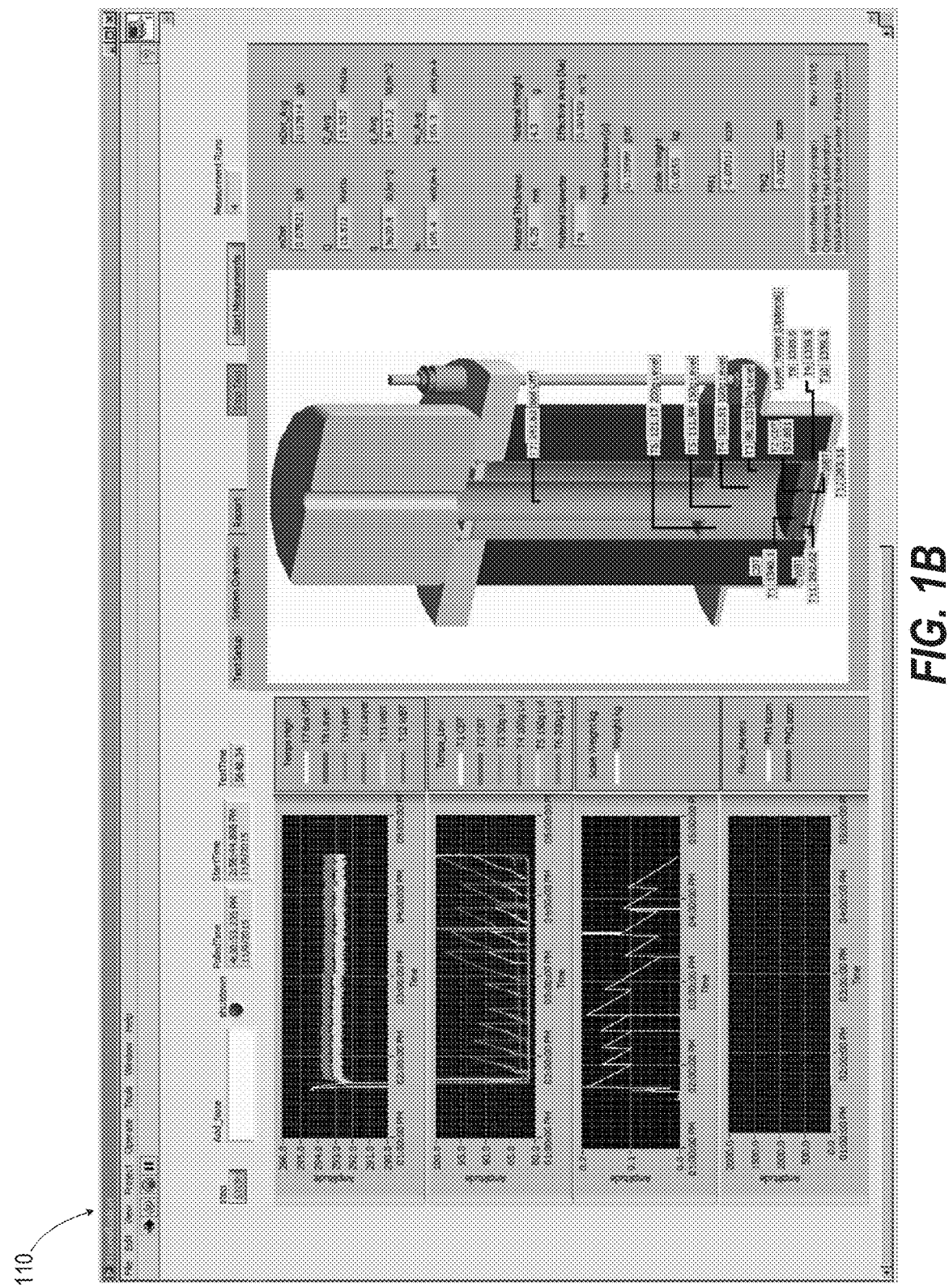
FIG. 1B illustrates a depiction of a graphical user interface (GUI) of the testing system of FIG. 1A, according to one or more embodiments.

FIG. 1B illustrates the inter-layer temperature sensors (T8, T9, and T10) that can be used to obtain additional thermal performance information for a given test specimen. One or more such interlayer temperature sensors, such as 36 gauge Type E thermocouples, can be along the vertical axis of the disk specimen to determine the thermal conductivity values at different locations through the thickness of the test specimen. The test specimen can be of a monolithic type but multilayer types are particularly well-suited for instrumentation in this way. Because the boundary temperatures are fixed and the heat flow rate is constant through the total thickness of the test specimen, thermal conductivities for multiple mean temperatures can be directly calculated from a single steady-state boiloff test using the Macroflash in conjunction with interlayer temperature sensors.

In another embodiment of the invention as seen in Table 2, the lower heater disk temperature sensors (T11 and T12) can be used with or without the additional interlayer temperature sensors (T8, T9, and T10) for producing transient thermal performance data. This transient mode of operation provides the time-temperature response data through the thickness of the test specimen. The manner of operation begins at steady-state temperature conditions throughout the apparatus followed by immediate filling of the cup reservoir with a boiling cold liquid (such as liquid nitrogen) or a boiling hot liquid (such as water) and the data recording of the temperature sensors from top to bottom of the test specimen. These transient test data complement the steady-state thermal conductivity data for different material applications subject to environmental changes and the effects of heat capacity (or specific heat) properties.

FIG. 1B illustrates the GUI 110 as displaying temperature sensor designations as listed in TABLE 2:

TABLE 2

| Sensor | Function |
| --- | --- |
| T1, | T2 Cold Boundary Temperature (CBT) |
| T3, T4, T5, T6 | Liquid Level at 50 g, 100 g, 150 g, and 200 g locations, respectively |
| T7 | Boiloff flow stream |
| T8, T9, T10 | Test specimen inter-layer temperatures (optional) |
| T11, T12 | Warm Boundary Temperature (WBT) |

(Note: sensor numbers (e.g., T1, T2, etc.) in this table/figure do not correspond to sensor numbers in any other figure)

Figure 2:
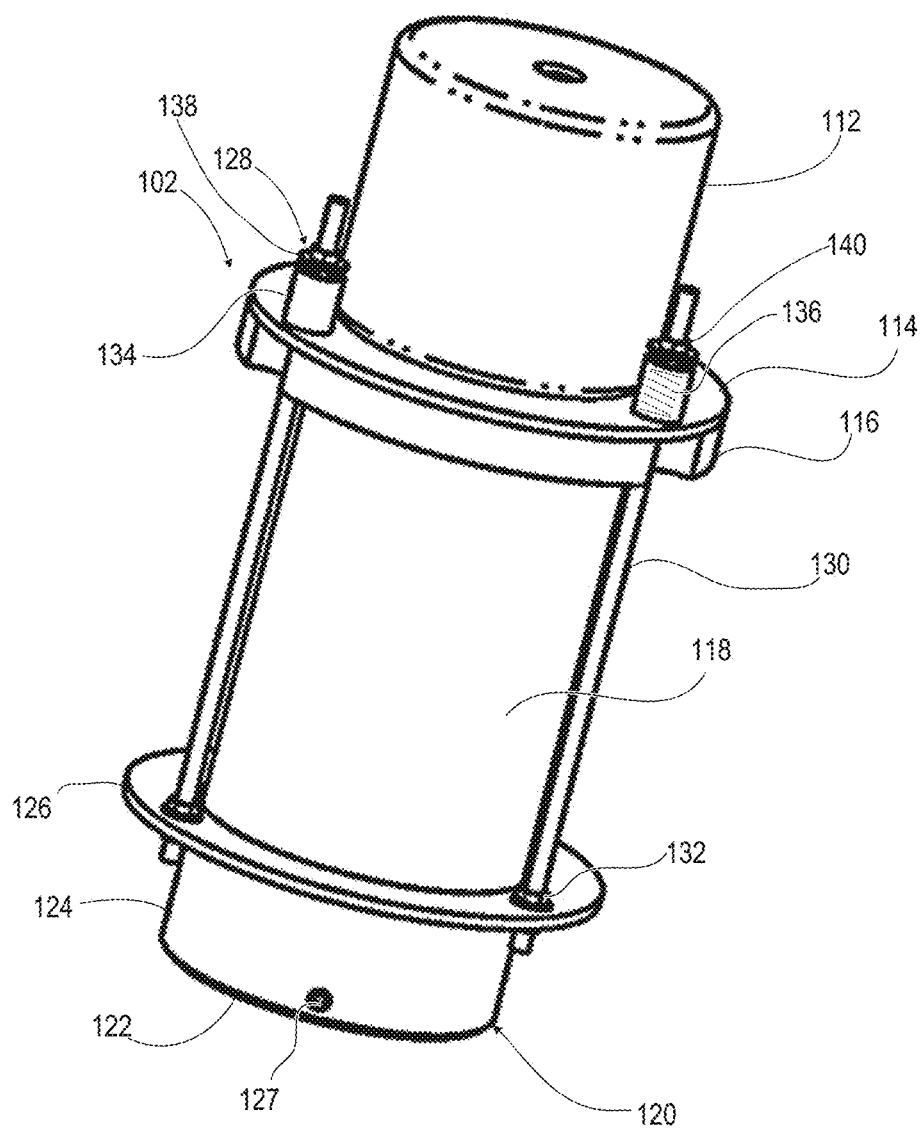
FIG. 2 illustrates an isometric view of the cup cryostat of FIG. 1A, according to one or more embodiments.
Figure 3:
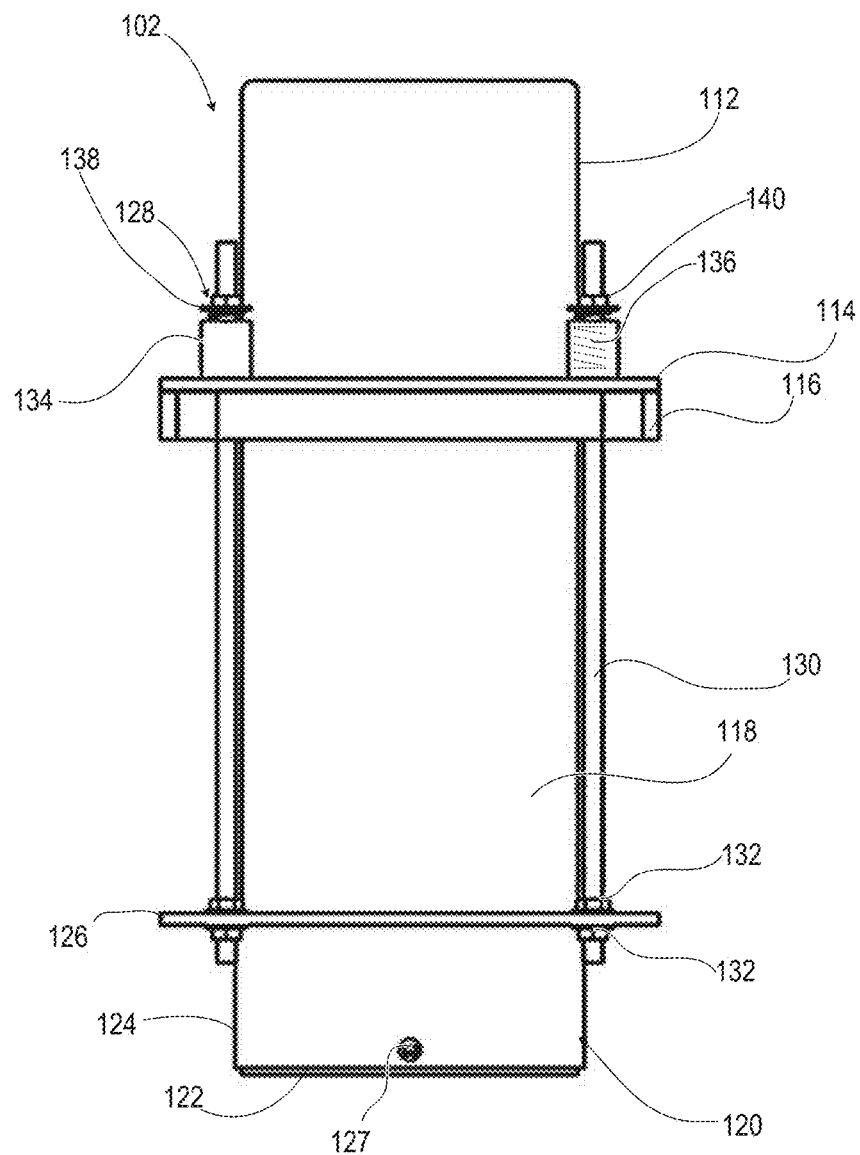
FIG. 3 illustrates a side view of the cup cryostat of FIG. 1A, according to one or more embodiments.

FIGS. 2-3 illustrate the cup cryostat 102 has a cap 112 formed from polyvinyl chloride (PVC) foam that sits on a top plate 114 formed from ½" thick aluminum 6061 aluminum plate. The top cap 112 serves as an insulation cylinder that keeps cold vapors from directly wafting down the side of the cup cryostat 102 during cool down/filling and during boiloff venting from test. This top cap 112 therefore minimizes any secondary effects of cold vapors impinging on the test region (lower half) of the cup cryostat 102 and mitigates any influence on the thermal measurement. Below top plate 114, a fiberglass (e.g., CRYO-LITE® or equivalent, 1 pound per cubic foot) insulation apron 116 is above a cup wrap 118 having a lower portion received within a base cup 120. The cup wrap 118 is formed of an aerogel insulation material with an outer layer of double aluminized Mylar. The base cup 120 is a weldment formed from a base lower plate 122 of ¼" thick aluminum 6061 plate, a base tube 124 of 7 OD×⅛" thick wall of aluminum 6061 plate, and a base top plate 126 that extends annularly and horizontally as a mounting ring and is formed of ¼" thick aluminum 6061 plate. Three radially spaced holes 127 are formed through the base tube 124, one of which receives a nitrogen gas (GN2) or compressed air flared tube fitting and the other two serve as access points for sensor wires.

In an exemplary embodiment, a multilayer aerogel wrap is composed of multiple and alternating layers of aerogel composite blanket material, thermal radiation shield material (aluminum), and a moisture barrier. The lower end of approximately 1" of lower edge is trimmed of any radiation/moisture layer material to ensure absolute minimum thermal conduction between wrap and base (first aerogel ring layer). The wrap is further overwrapped with vinyl wrap to ensure tightness with nominal amount of compression that further ensures that the wrap remains sufficiently tight through cold/hot thermal cycles. The air ingestion and breathing out is controlled through the ends (top and bottom). Furthermore, the aerogel blanket materials are super-hydrophobic, which is a feature that, together with the radiation/moisture barrier layers, eliminates any migration or accumulation of moisture inside at the vicinity of the internal cup assembly. However, the wrap system, in this complex of different layers, still provides the necessary flexibility and localized deformation for the optimum fit-up and installation of imperfect test specimens as well as test specimens of different thicknesses from zero up to about 15 mm in the specific 3" diameter design unit. The multilayer aerogel wrap reduces heat leakage rate ("heat leak") through the side wall such that the large majority of the total heat leak is through the test specimen thickness and into the cup (and not from the side or edge of the test specimen). The multilayer aerogel wrap eliminates bottom gap and minimize all edge effects with the test specimens. The multilayer blanket wrap is adjustable and movable according to different thickness test specimens and with imperfectly round/square edges. The blanket wrap layers interface with lower aerogel blanket insulation rings in the base to provide repeatability between different test specimens and always eliminate any gap (open air space) for any test specimen no matter the thickness, flatness, or roundness factors. The multilayer aerogel wrap provides a stable reservoir of passive refrigeration power when it charged up with air adsorbed and in stable equilibrium with the ambient environment. The cool down with the boiloff fluid (for example LN2) and subsequent replenishment of LN2 within a certain liquid level range causes the physisorption (molecular adsorption) of air molecules on the nano-porous internal surfaces of the aerogel.

For this specific and current 3" diameter design in operation today, the charging time for physisorption within the aerogels (both aerogel blanket wrap and concentric cup bulk-fill aerogel combined), is from 15-30 minutes for a rough equilibrium and from 60-90 minutes for a fine equilibrium. The variation in time, as given above, depends on the test specimen type and thickness. Fine equilibrium is required for special cases such as calibration data or very low thermal conductivity materials. The corresponding liquid levels are between 50 g and 100 g (between 11 and 22 mm liquid depth) for the test measurement and between 50 g and 150 g (between 11 and 33 mm) for the cool down/filling test preparation phase.

Figure 4:
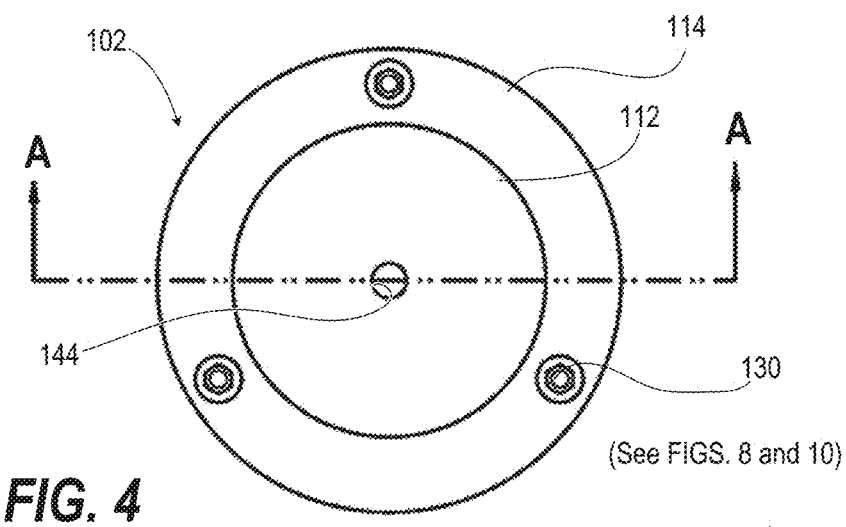
FIG. 4 illustrates a top view of the cup cryostat of FIG. 1A, according to one or more embodiments.
Figure 5:
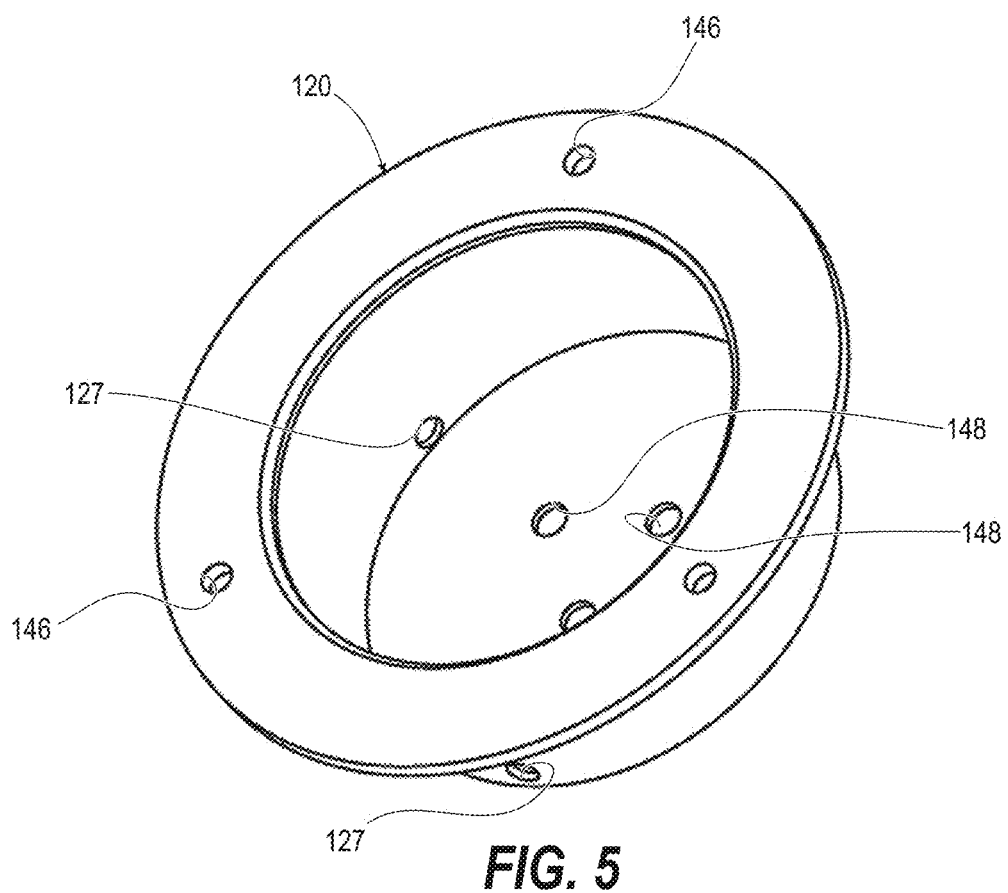
FIG. 5 illustrates an isometric view of a base cup of the cup cryostat of FIG. 1A, according to one or more embodiments.
Figure 6:
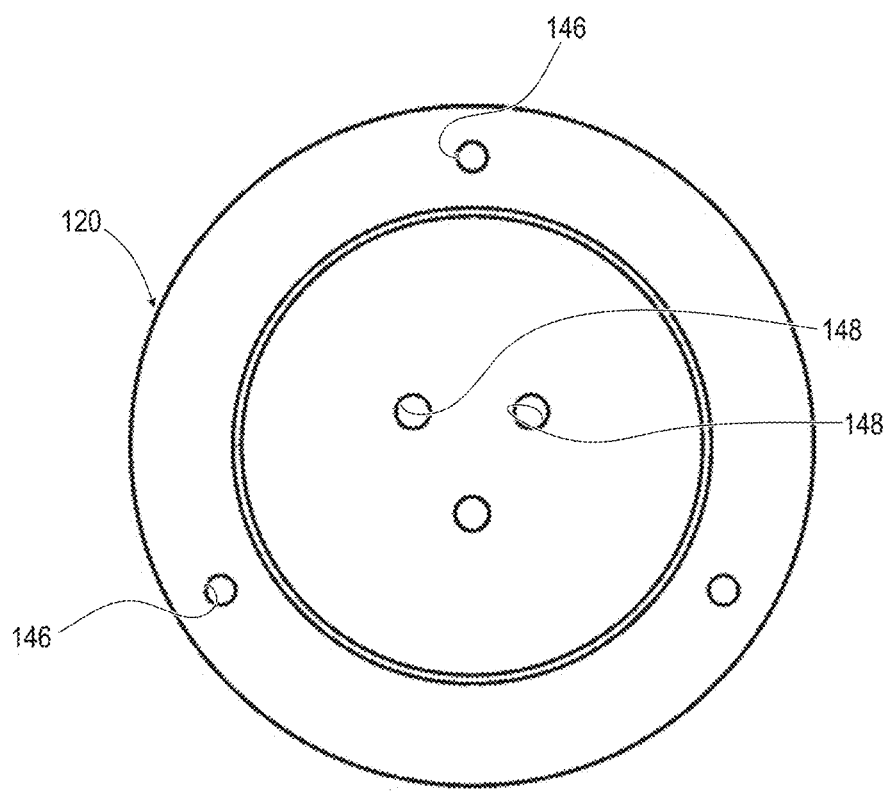
FIG. 6 illustrates a top view of the base cup of FIG. 5, according to one or more embodiments.
Figure 7:
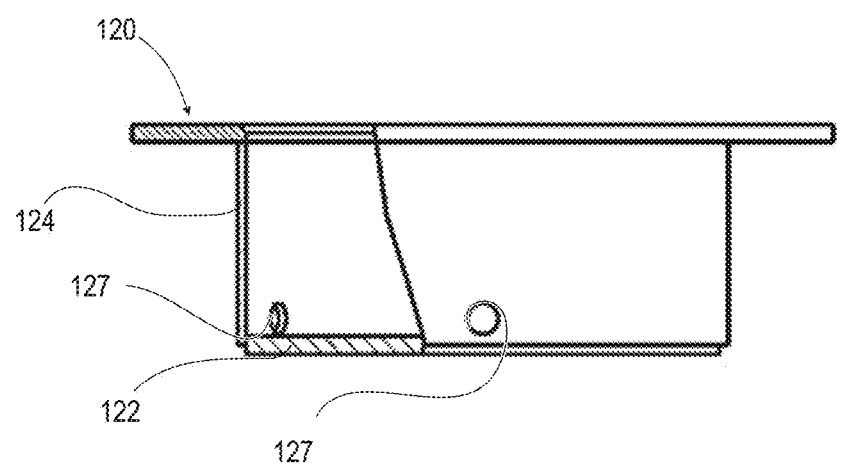
FIG. 7 illustrates a side view, partially cut away, of the base cup of FIG. 5, according to one or more embodiments.

A compression loading system 128 is formed by three SST threaded rods 130 that are radially spaced and vertically oriented around the cup wrap 118. Bottom ends of the threaded rods 130 pass through holes in the top plate 126 of the base cup and are engaged by top and bottom nuts 132. Top ends of the threaded rods 130 pass through holes 115 in the fiberglass insulation apron 116 and top plate 114. A spring housing 134 of acrylonitrile butadiene styrene (ABS) plastic sits on the top plate 114 around the extended end of the each threaded rod 130 respectively. Each spring housing 134 encompasses a compression spring 136, which in turn encompasses the respective threaded rod 130. A washer 138 rests on top of the compression spring 136 and is retained by a nut 140. Sufficient clearance exists between the spring housing 134 and the nut to allow for a range of compression adjustment. FIG. 4 is a top view of cup cryostat 102 that illustrates that the compression loading system 128 is radially spaced with threaded rods 130 being 120° apart around the top plate 114 and that the cap 112 has a vertical, central passage 144. FIGS. 5-7 illustrate that the base cup 120 has corresponding holes 146 in the base top plate 126 (not shown). In addition to holes 127 that are formed through the base tube 124, the base lower plate 122 has three access holes 148 that receive respective G10 pegs 168 (FIG. 9A) that ensure ultimate flatness of a specimen holding assembly and installed test specimen.

In one exemplary embodiment, the compression loading system 128 determines the compression load (psi) corresponding to the currently used load settings of 0, 2, and 5 psi (on the 3-inch diameter disk specimen). The targets are <0.5, 2, and 5 psi or as decided by additional materials testing requirements. The compression loading system 128 is convenient to remove and replace. The different load settings are easily interchanged and clearly marked. The following 5-packs of springs have been specified: 302 Stainless Steel Precision Compression Spring, McMaster-Carr: (i) 0.875" Length, 0.480" OD, 0.038" Wire, #9435K99, Load 4.84 lb, Rate 9.12 lb/inch; and (ii) 0.750" Length, 0.720" OD, 0.063" Wire, #9435K142, Load 13.48 lb, Rate 28.68 lb/inch. The three spring assemblies are integrated with the top plate and are located on the upper surface.

Figure 8:
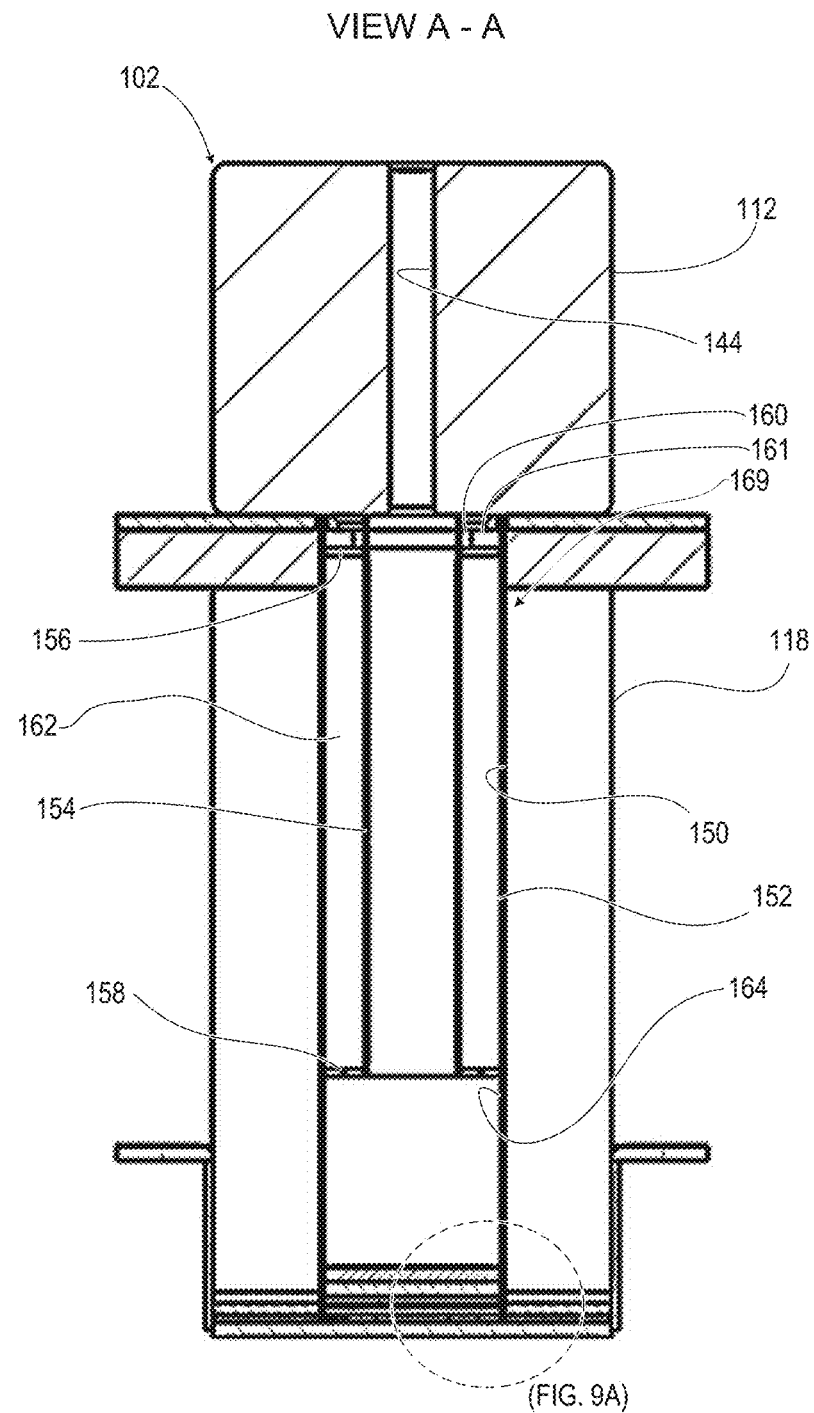
FIG. 8 illustrates a side view of the cup cryostat of FIG. 4 cutaway along lines A-A, according to one or more embodiments.

FIG. 8 illustrates that the vertical central passage 144 in the cap 112 is aligned with a cylindrical bore 150 formed in the cup wrap 118 that closely receives a G10 outer tube 152. A G10 inner tube 154 is centered in an upper portion of the G10 outer tube 152 by a G10 top centering ring 156 and a G10 bottom centering ring 158. Inner and outer cryosponge rings 160, 161 sit on top of the G10 top centering ring 156. Annular space 162 is the void between the G10 inner and outer tubes 152, 154 and between the G10 top and bottom centering rings 156, 158 which is filled with bulk-fill insulation (e.g., aerogel beads). LN2 is poured into a cold cup 164 formed below the bottom centering ring 158 and inside of the G10 outer tube 152 and closed by a cold plate 166 (FIG. 9A) of ¼" thick copper plate. The cold cup 164 contains a cryogenic liquid such as LN2 167 (FIG. 9A) or other boiloff fluid for testing.

Functions and features of a concentric tube assembly 169 thereby formed can include, but are not necessarily limited to: (i) establishes the physical dimensions and volume of the "cup"; (ii) lower centering ring provides mounting of the liquid level (temperature) sensors and annular space between tubes provides conduit for the instrumentation lead wires; (iii) facilitates and provides for the attachment and removal of the optional flow meter connecting tube via plug sealing stopper assembly; and (iv) aerogel bulk-fill thermal insulation material within annular space and the breathing port on outside tube provides a stable reservoir of passive refrigeration (cold power) during the testing phase (working in concert with and in addition to the aerogel blanket wrap) to further extend the useful thermal measurement range of operation.

Figure 9A:
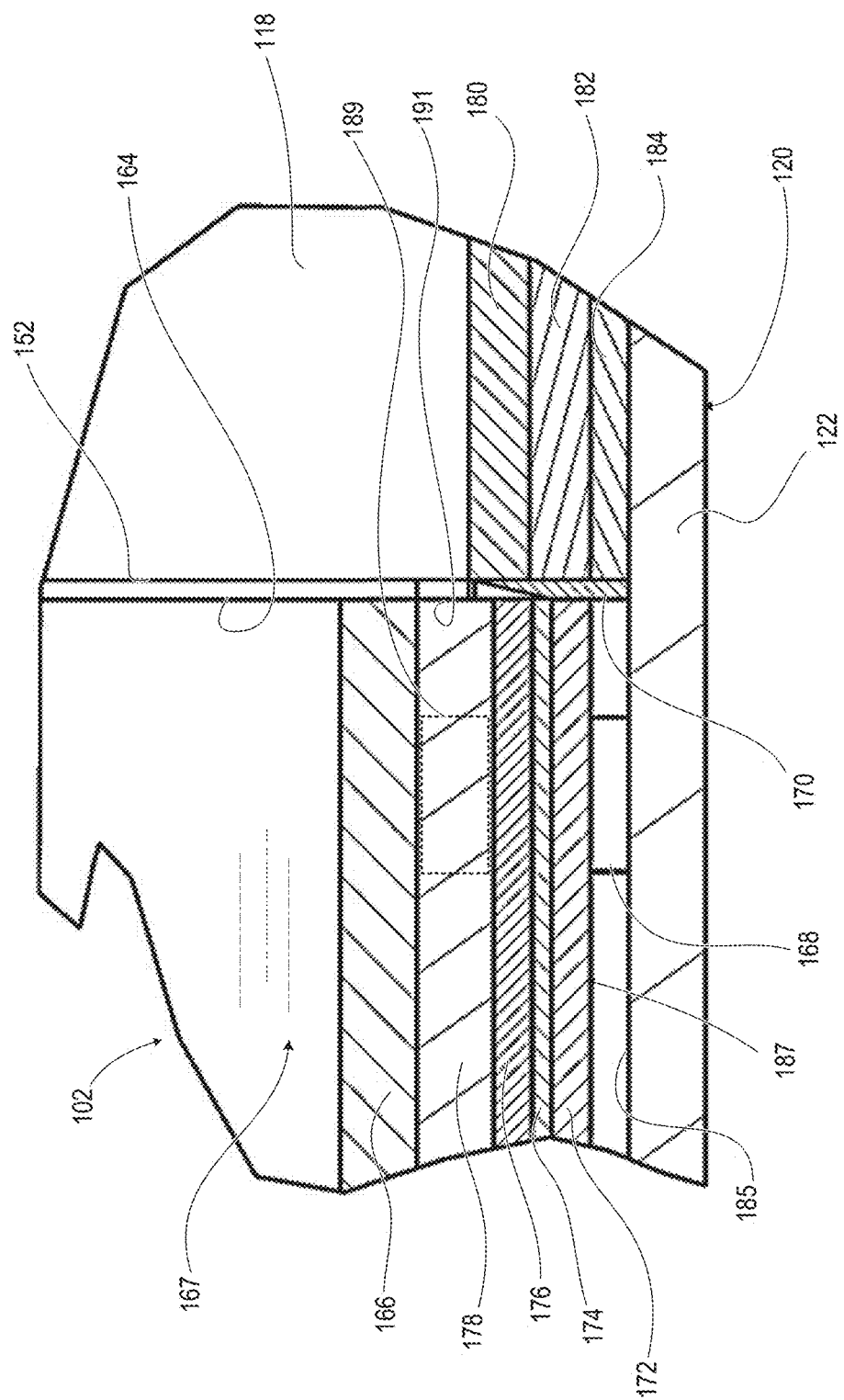
FIG. 9A illustrates a detail view of the cup cryostat of FIG. 8, according to one or more embodiments.

FIG. 9A illustrates that G10 pegs 168 sit on the base lower plate 122 of the base cup 120. Each G10 peg 168 is formed from a G10 tube with ½" OD×1/16" thick wall. The G10 support pegs 168 are surrounded by a cylindrical specimen ring 170 that also sits on the base lower plate 122 of the base cup 120. The G10 support pegs 168 create a separation cavity 185, minimizing thermal conductive contact between heat disk assembly 187. The heat disk assembly 187 includes a lower heater plate 172 formed of ⅛" thick aluminum 6061 plate that sits on top of the G10 pegs 168. The heat disk assembly 187 includes an electric heater 174 that sits on the lower heater plate 172. The heat disk assembly 187 includes an upper heater plate 176 of ⅛" thick copper plate that sits on top of the electric heater 174. A test specimen 178 is between the upper heater plate 176 and the cold plate 166. Outside of the specimen ring 170 and inside of the base cup 120 beneath the cup wrap 118 is an annular stack of a first base insulation ring 180 of 5 mm thick aerogel composite blanket material such as Cryogel X201 (or Pyrogel or equivalent, Aspen Aerogels Inc.), which is in turn on a second base insulation ring 182 of 5 mm thick Cryogel X201, which is in turn on a base centering ring 184 of ⅛" thick G10 plate, which is in turn on the base lower plate 122.

Test cavity G10 pegs 189 can be in inserted into a test cavity 191 between the cold plate 166 and heat disk assembly 187 to define a minimum vertical height of the test cavity 191. The test cavity G10 pegs 189 enable testing of powder type materials. This capability was achieved by redesigning the test specimen and heat disk assembly 187 and all physical interfaces in that area. These details included: support by G10 pegs 168 for heat disk assembly 187, G10 base centering ring 184, and specimen ring 170. These new design features provided improvements across the board in the precision mounting of test specimens and the reliability of the placement and resulting thermal contact during testing.

Figure 9B:
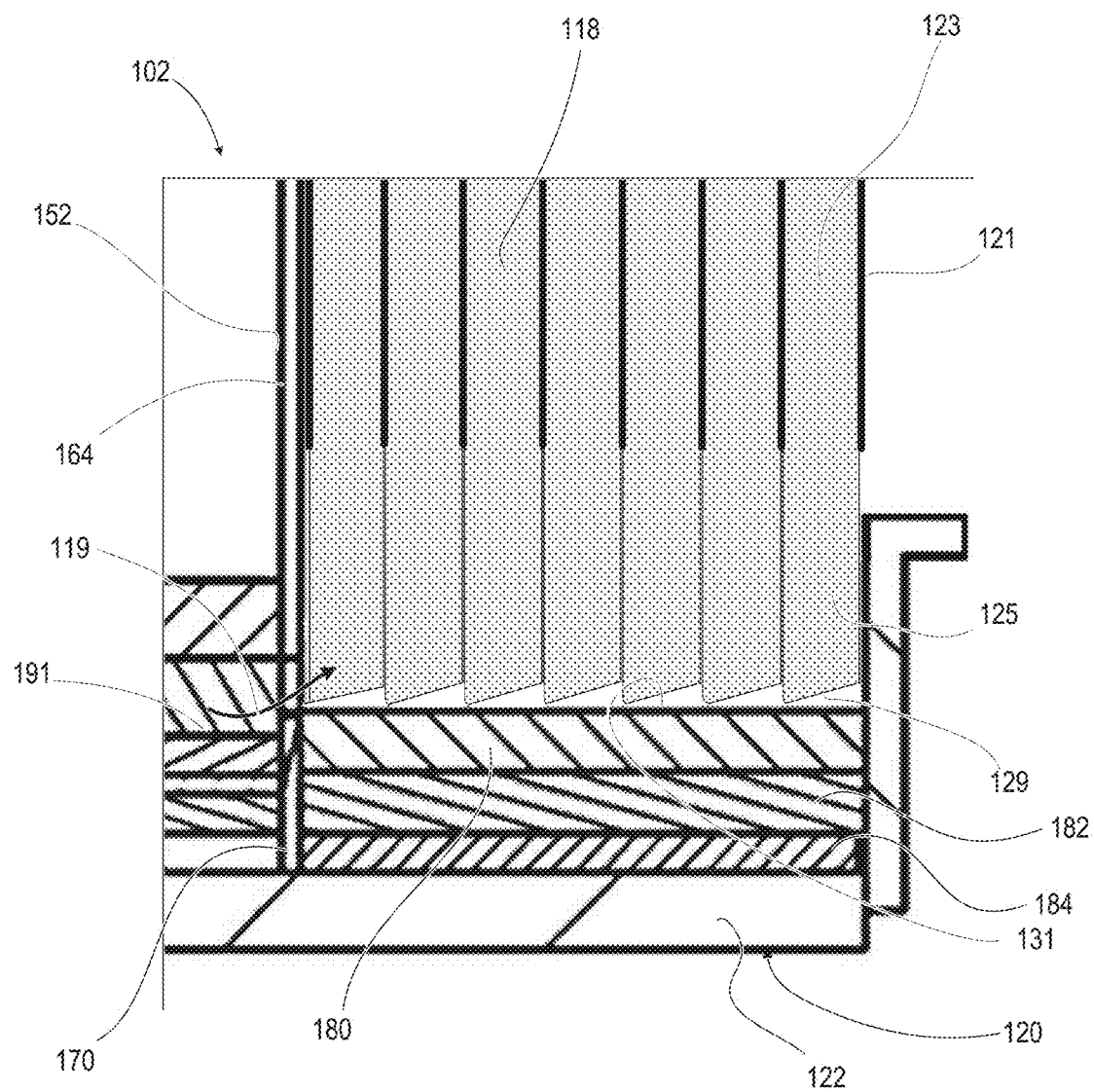
FIG. 9B illustrates a detail view of thermal wrap insulation layer of the cup cryostat of FIG. 9A, according to one or more embodiments.

FIG. 9B illustrates that the aerogel insulation materials, such as in the cup wrap 118, adsorb air 119 inside the nanoporous internal surfaces of the aerogel by the process of physisorption (or molecular adsorption) from the test specimen cavity 191 during the initial cool down and then reaches thermalization in due time. The adsorption of the air will remain stable during the testing with sufficient refilling of the cold cup 164. The aerogel insulation materials of the cup wrap 118 are formed from blanket wraps that move relative to the cold cup 164 to ensure precise fit-up on all test specimens 178 with no air gaps and ensuring test repeatability. In particular, a vapor barrier layer 121 that is exteriorly attached to each aerogel layer 123 of the cup wrap 118 is removed from a one-inch high bottom portion 125. The bottom portion 125 is thus allowed to adsorb the air from the test specimen cavity 191. Removal of the vapor barrier layer 121 also allows the bottom portion 125 to vertically compress as the cup cryostat 102 is adjusted. This bottom portion 125 also has a non-uniform (slightly jagged) bottom edge 129 that forms a tortuous air path 131 to mitigate or prevent lateral air movement and thus limit or stop heat transfer effects. The first and second base insulation rings 180, 182 that contact the non-uniform bottom edge 129 are also compressible, assisting in creating the tortuous air path 131.

FIGS. 10-11 illustrate that temperature sensors such as thermocouples are positioned to measure temperature values for liquid levels inside the cup 102. FIG. 10 illustrates T4, T5, T6, and T7 temperature sensors positioned in a vertical series within the concentric tube 152 corresponding to the cold cup 164 with T99 thermocouple placed inside the inner tube 154 to measure the boiloff flow gas temperature. The T8 temperature sensor is located on the outside of cold cup 164 to facilitate warm-up heater control (not shown). FIG. 11 illustrates T1, T2, and T3 temperature sensors placed into pilot holes on the edge of cold plate 166. T11, T12, and T13 temperature sensors are mounted within recessed channels on an undersurface of the upper heater plate 176. In an exemplary embodiment, the temperature sensors are thermocouples of type E, 30-gauge wire size. T1 and T2 provide optional temperature sensing of the cold plate 166 with one redundant sensor, T3. The thermodynamic properties of heat of vaporization and normal boiling point temperature for the given boiloff fluid provide a known temperature of the cold plate (199 J/g and 77.4 K for LN2, for example). The T4 location in the cold tube at 11 mm up corresponds to 50 g liquid level. The T5 location in the cold tube at 22 mm up corresponds to the 100 g liquid level. The T6 location in the cold tube at 33 mm up corresponds to the 150 g liquid level. Temperature readings among T4, T5, and T6 thermocouples are used to alert a user, or input to an automated control system, as to the need to refill the cup. T7 location in the cold tube at 44 mm up corresponds to the 200 g liquid level near the entrance to the concentric tube. The T99 thermocouple is located within the concentric tube, middle, to measure the boiloff gas exit temperature. T99 can also be used for independent calibration of the heat flow measurement based on the convective heat transfer influence on the temperature of the boiloff flow gas exiting the system. For specialized cases, or for alternate embodiments, the need for a weight scale or a flow meter is obviated. T11 and T12 provide the required warm boundary temperature measurement for the test and T13 provide an output signal to a heater controller for the heater plate.

Figure 12:
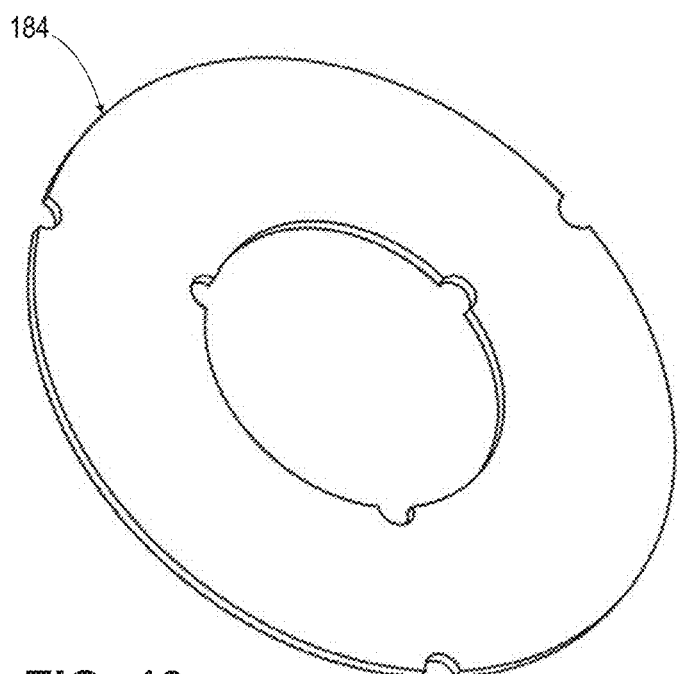
FIG. 12 illustrates an isometric view of a base centering ring of the cup cryostat of FIG. 1A, according to one or more embodiments.
Figure 13:
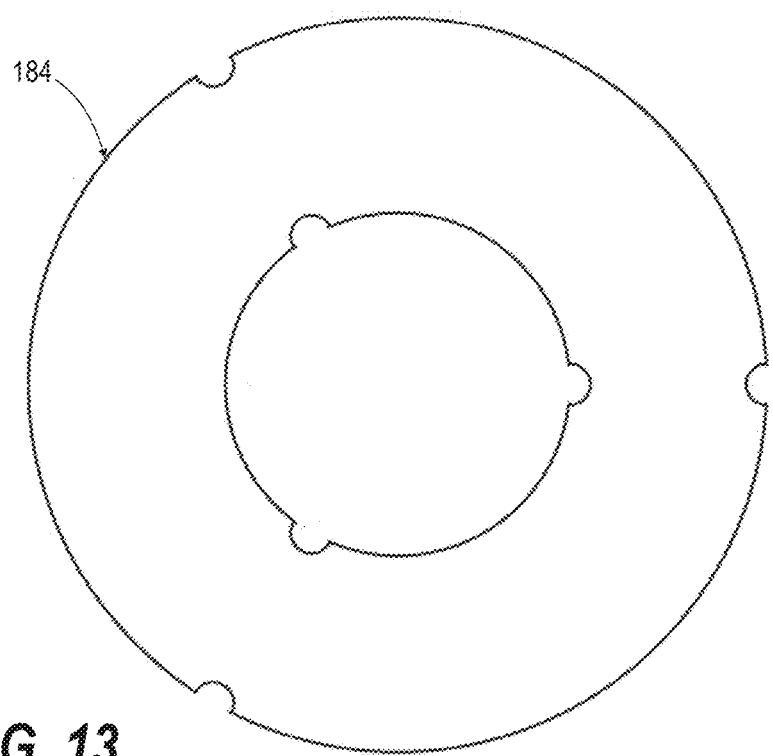
FIG. 13 illustrates a top view of the base centering ring of FIG. 12, according to one or more embodiments.
Figure 14:
FIG. 14 illustrates a side view of the base centering ring of FIG. 12, according to one or more embodiments.
Figure 15:
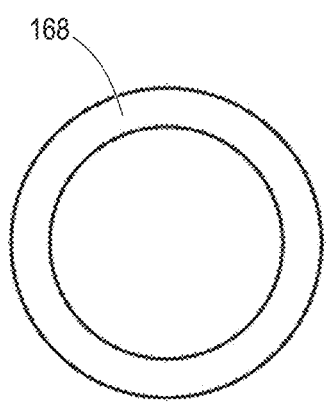
FIG. 15 illustrates a top view of a test cavity G10 peg of the cup cryostat of FIG. 1A, according to one or more embodiments.
Figure 16:
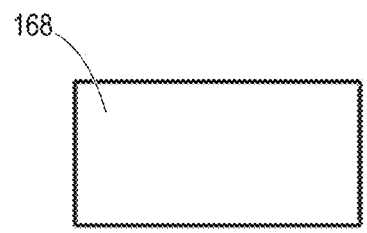
FIG. 16 illustrates a side view of the test cavity G10 peg of FIG. 15, according to one or more embodiments.

FIGS. 12-14 illustrate the base centering ring 184. This centering ring 184 ensures ultimate and eventual concentricity of the test specimen holding fixture and is a low thermal conductivity structural material (such as G10) to minimize heat conduction between the heater assembly and the aluminum base. FIGS. 15-16 illustrate the G10 peg 168.

Figure 17:
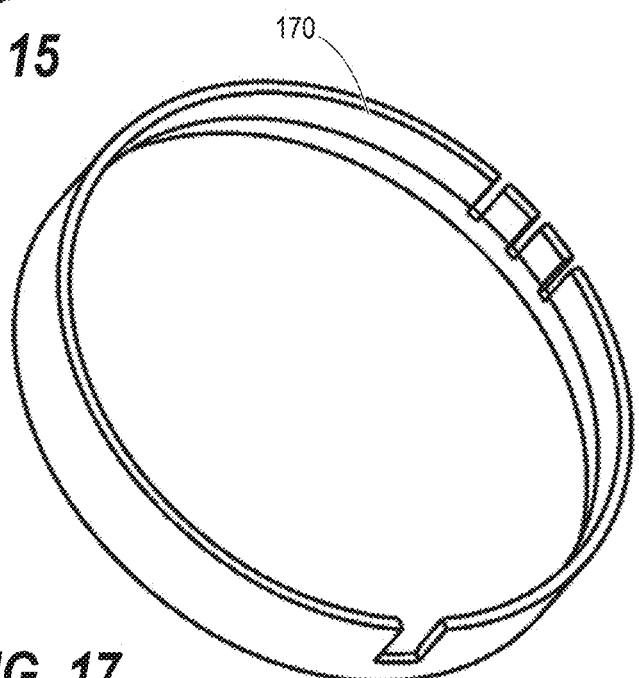
FIG. 17 illustrates an isometric view of a specimen ring of the cup cryostat of FIG. 1A, according to one or more embodiments.
Figure 18:
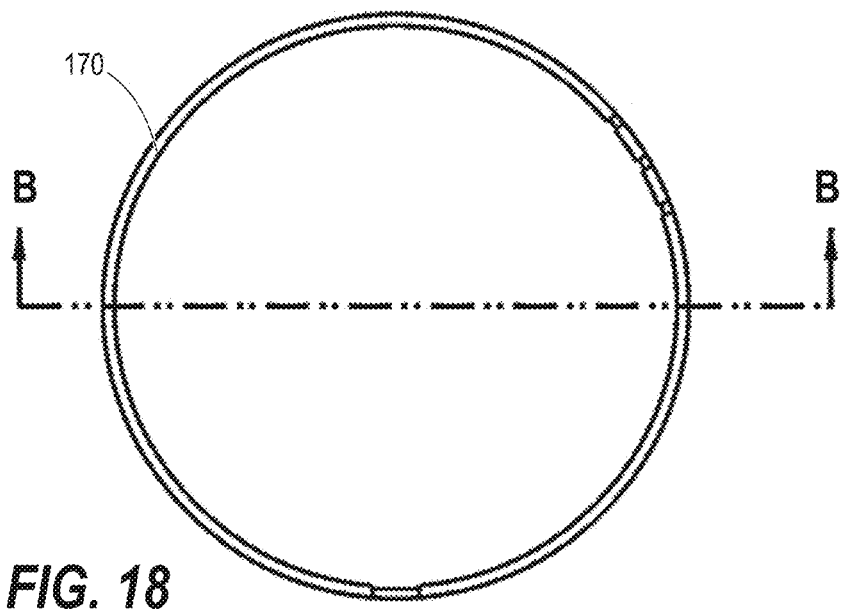
FIG. 18 illustrates a top view of the specimen ring of FIG. 17, according to one or more embodiments.
Figure 19:
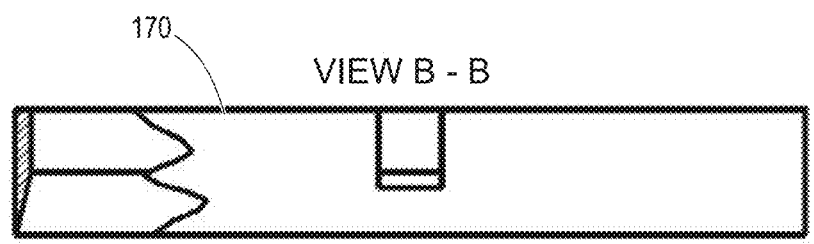
FIG. 19 illustrates a side view of the specimen ring of FIG. 18 cutaway along line B-B, according to one or more embodiments.

FIGS. 17-19 illustrate the specimen ring 170 that serves as a specimen holder. The specimen ring 170 has a chamfered edge to reduce thermal conductivity. This test specimen holding ring is highly engineered and precision machined to provide a knife edge for zero solid conduction heat transfer between the ring and the adjacent cup (cold plate). The diameter of the ring's knife is slightly larger than the outer diameter of the cup. There is no physical contact by the convergence of all design elements for concentricity, flatness, and diameters.

Figure 20:
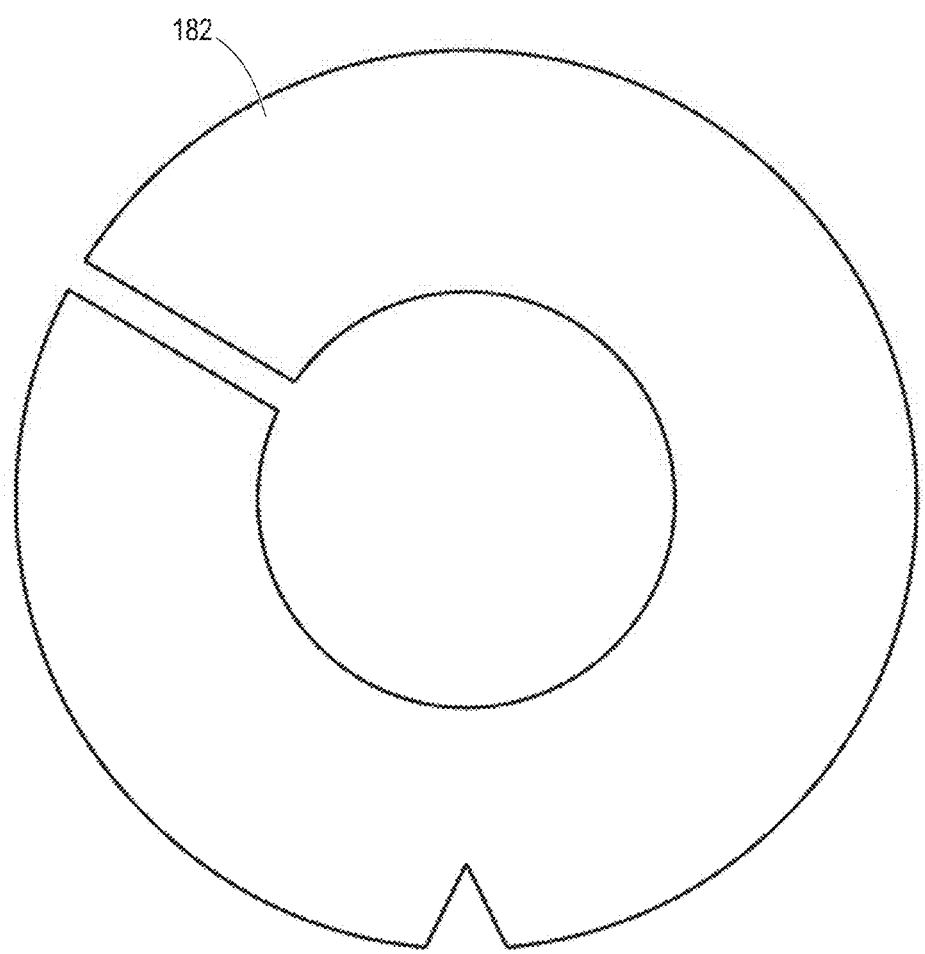
FIG. 20 illustrates a top view of a second base insulation ring of the cup cryostat of FIG. 1A, according to one or more embodiments.
Figure 21:
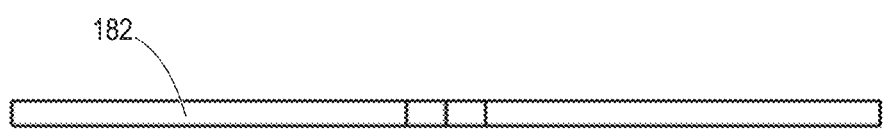
FIG. 21 illustrates a side view of the second base insulation ring of FIG. 20, according to one or more embodiments.
Figure 22:
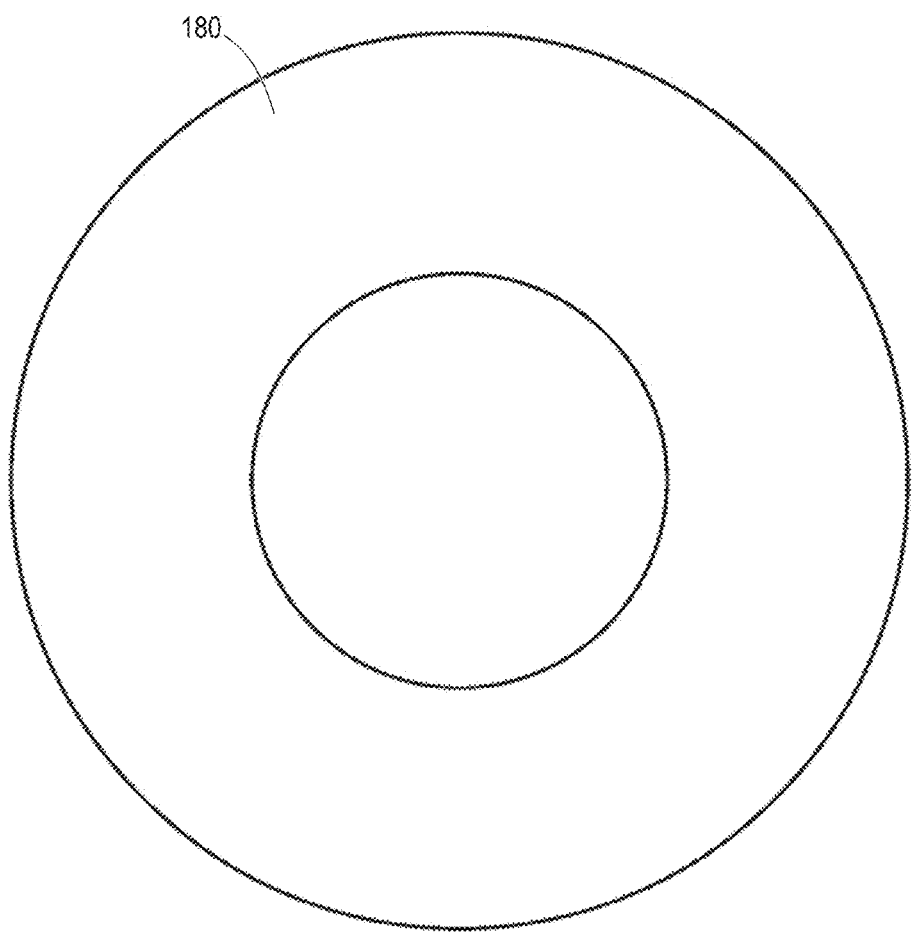
FIG. 22 illustrates a top view of a first base insulation ring of the cup cryostat of FIG. 1A, according to one or more embodiments.
Figure 23:
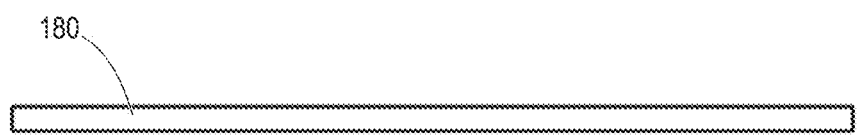
FIG. 23 illustrates a side view of the first base insulation ring of FIG. 22, according to one or more embodiments.
Figure 24:
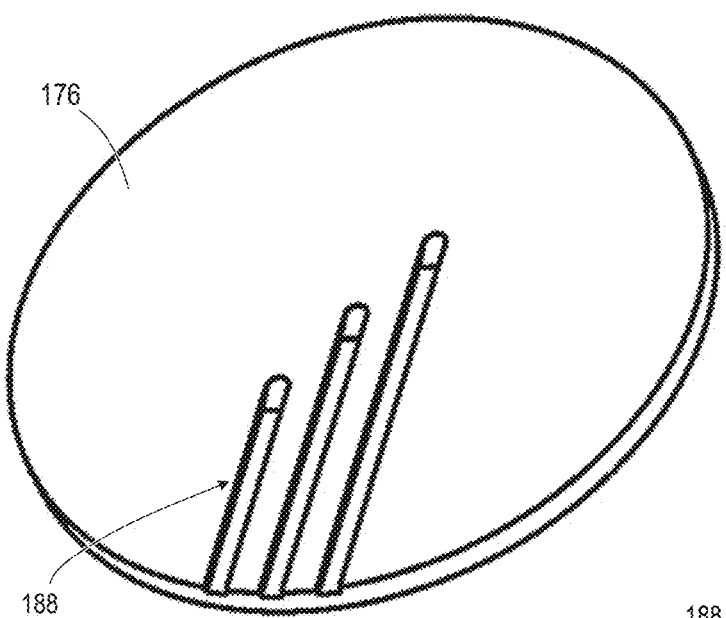
FIG. 24 illustrates an isometric view of a upper heater plate of the cup cryostat of FIG. 1A, according to one or more embodiments.
Figure 25:
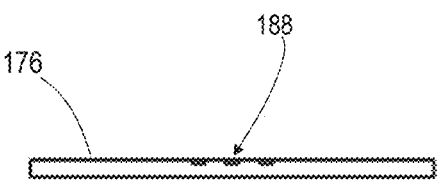
FIG. 25 illustrates side view of the upper heater plate of FIG. 24, according to one or more embodiments.
Figure 26:
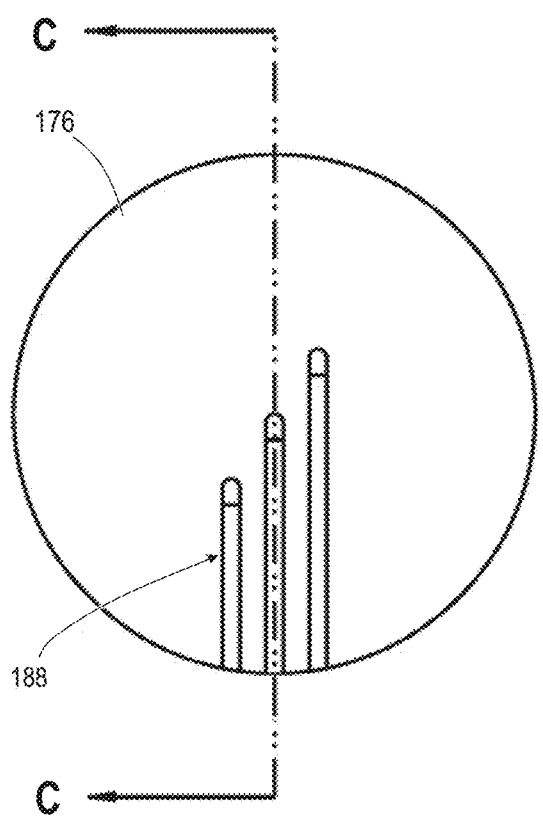
FIG. 26 illustrates a top view of the upper heater plate of FIG. 24, according to one or more embodiments.
Figure 27:
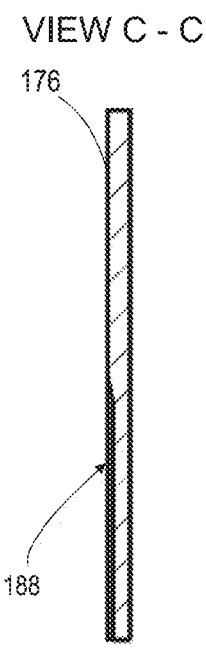
FIG. 27 illustrates a side view of the upper heater plate of FIG. 26 cutaway along line C-C, according to one or more embodiments.

FIGS. 20-21 illustrate the second base insulation ring 182. The gap shown is for routing the electrical lead wires for the heater. FIGS. 22-23 illustrate the first base insulation ring 180. The number of insulation rings 180, 182 can be selected to correspond to a vertical height of a test specimen 178. The shape of the specimen ring 170 can be changed to accommodate a test specimen 178 that is not disc shaped.

Figure 28:
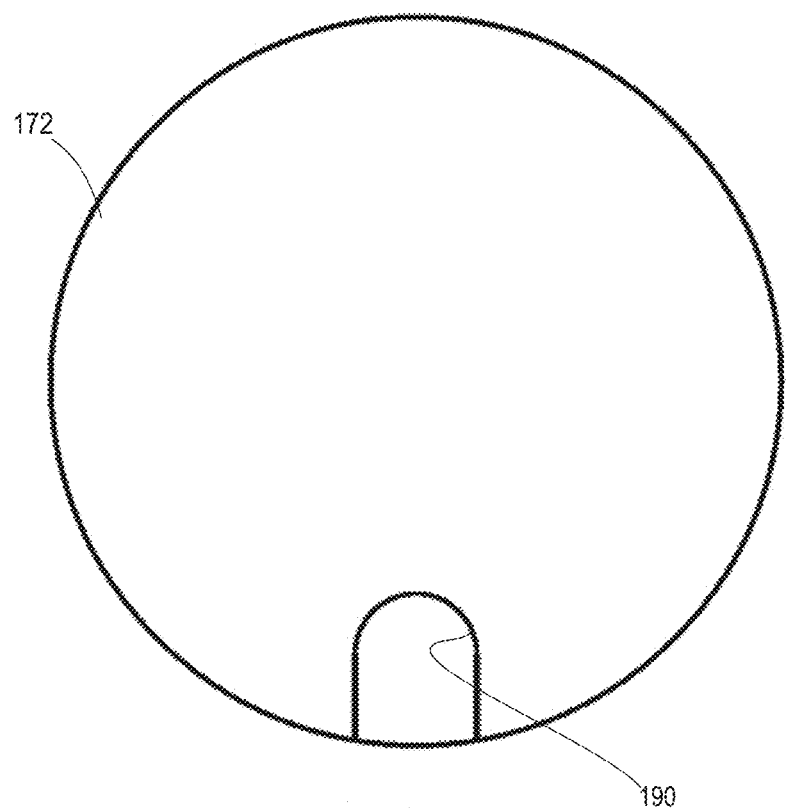
FIG. 28 illustrates a top view of a lower heater plate of the cup cryostat of FIG. 1A, according to one or more embodiments.
Figure 29:
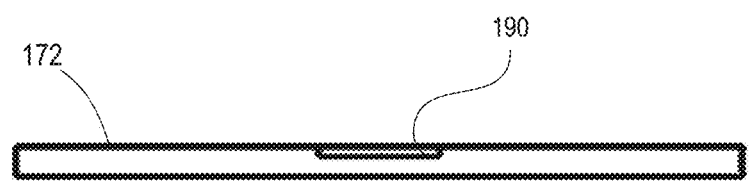
FIG. 29 illustrates side view of the lower heater plate of FIG. 28, according to one or more embodiments.
Figure 30:
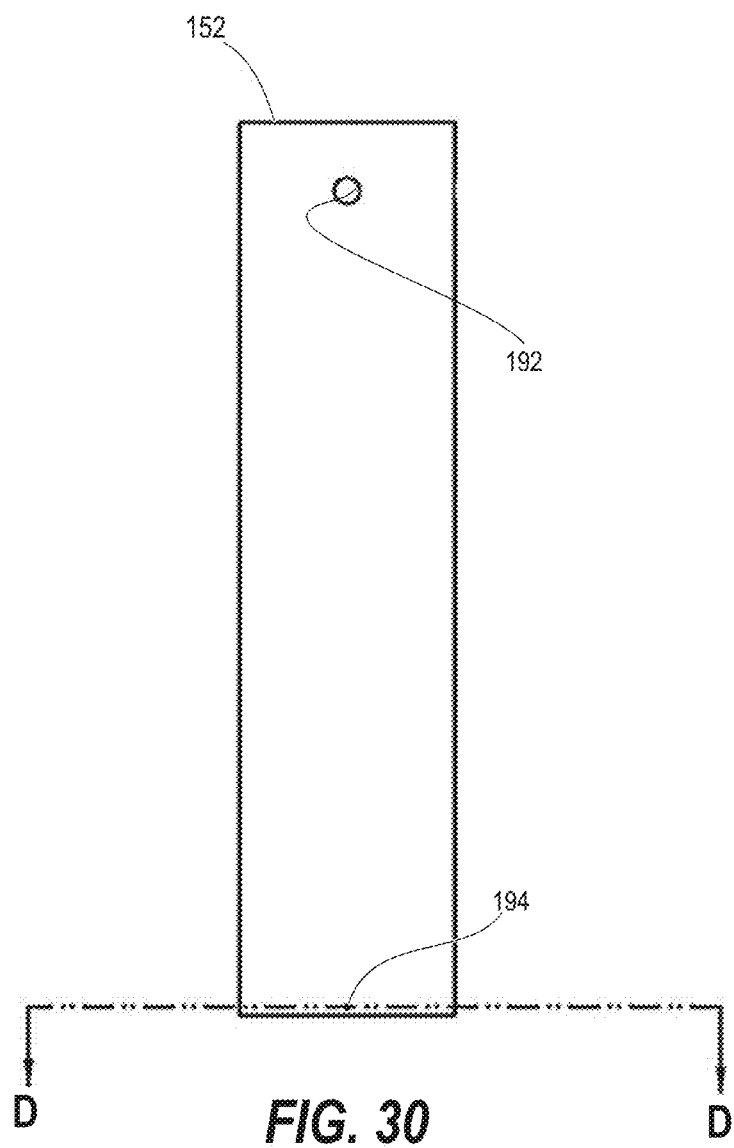
FIG. 30 illustrates a side view of a G10 outer tube of the cup cryostat of FIG. 1A, according to one or more embodiments.
Figure 31:
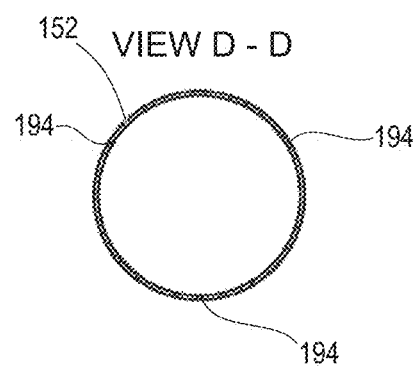
FIG. 31 illustrates top view of the G10 outer tube of FIG. 30 cut away along line D-D, according to one or more embodiments.
Figure 32:
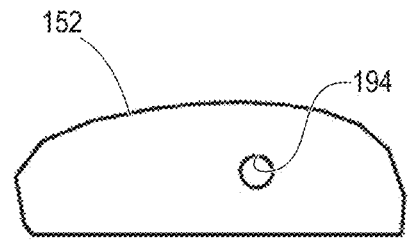
FIG. 32 illustrates side detail view of the G10 outer tube of FIG. 30, according to one or more embodiments.
Figure 34:
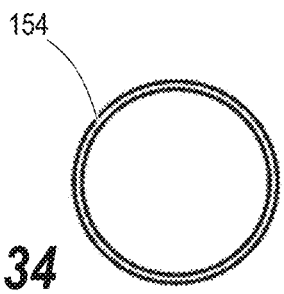
FIG. 34 illustrates top view of the G10 inner tube of FIG. 33, according to one or more embodiments.
Figure 33:
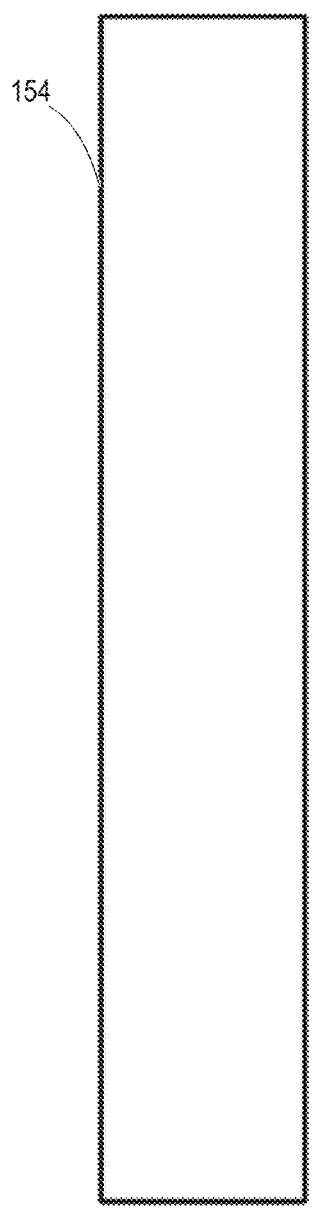
FIG. 33 illustrates a side view of a G10 inner tube of the cup cryostat of FIG. 1A, according to one or more embodiments.
Figure 35:
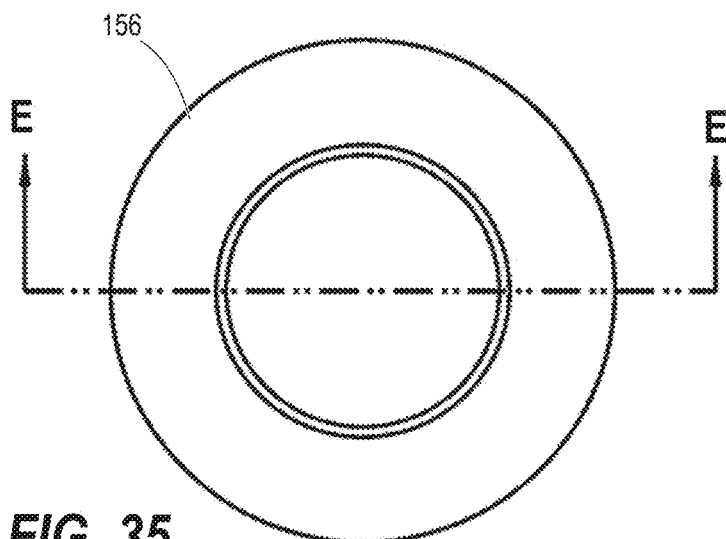
FIG. 35 illustrates a top view of a G10 top center plate of the cup cryostat of FIG. 1A, according to one or more embodiments.
Figure 36:
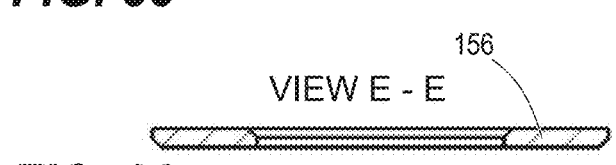
FIG. 36 illustrates a side view of the G10 top centering plate of FIG. 35 cutaway along line E-E, according to one or more embodiments.
Figure 37:
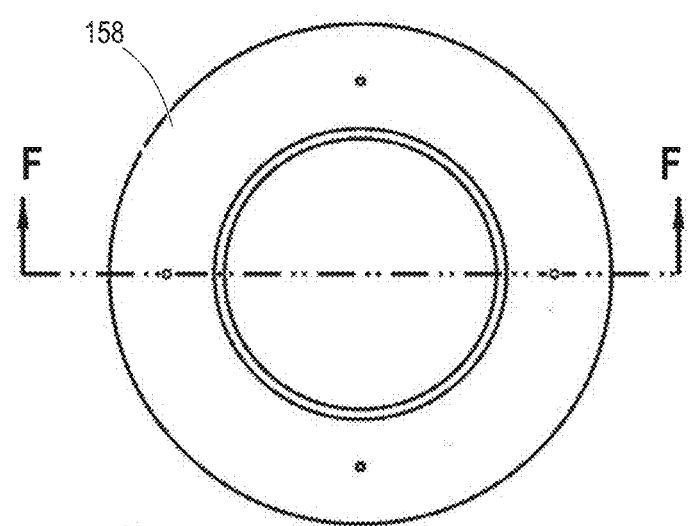
FIG. 37 illustrates a top view of a G10 bottom center plate of the cup cryostat of FIG. 1A, according to one or more embodiments.
Figure 38:
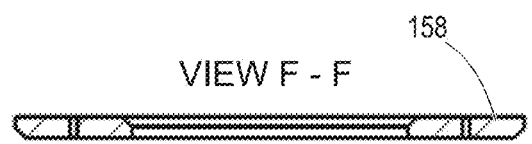
FIG. 38 illustrates a side view of the G10 bottom centering plate of FIG. 37 cutaway along line F-F, according to one or more embodiments.
Figure 39:
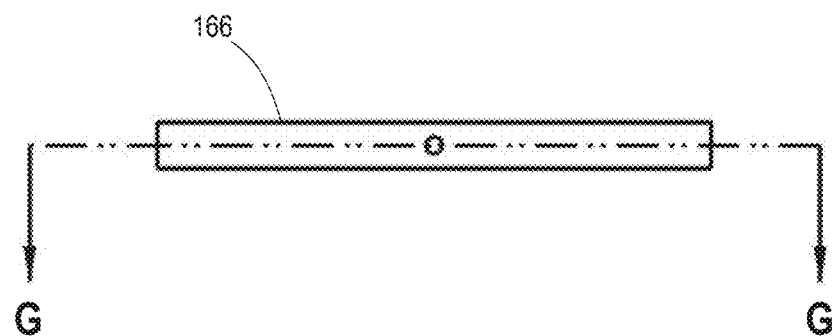
FIG. 39 illustrates a side view of a cold plate of the cup cryostat of FIG. 1A, according to one or more embodiments.
Figure 40:
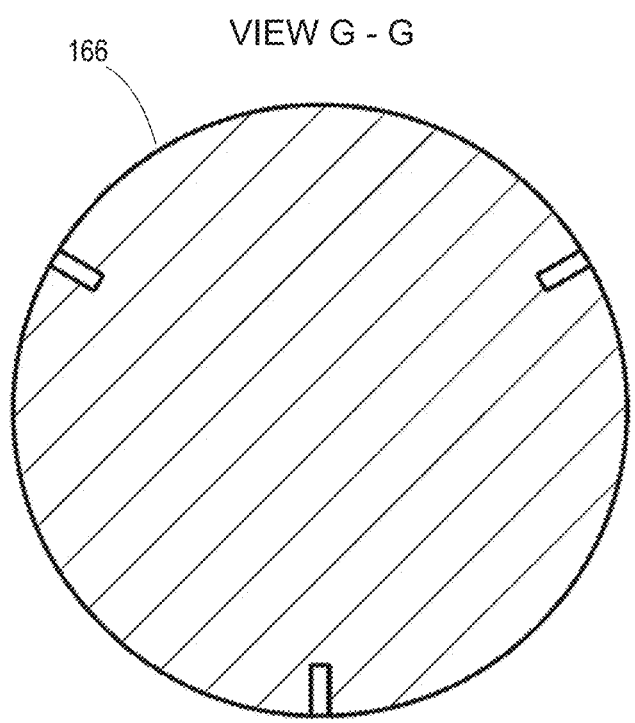
FIG. 40 illustrates a top view of the cold plate of FIG. 39 cutaway along line G-G, according to one or more embodiments.
Figure 42:
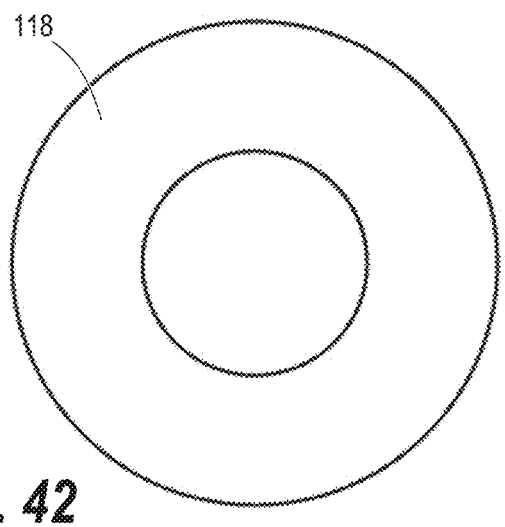
FIG. 42 illustrates a top view of the cup wrap of FIG. 41, according to one or more embodiments.
Figure 41:
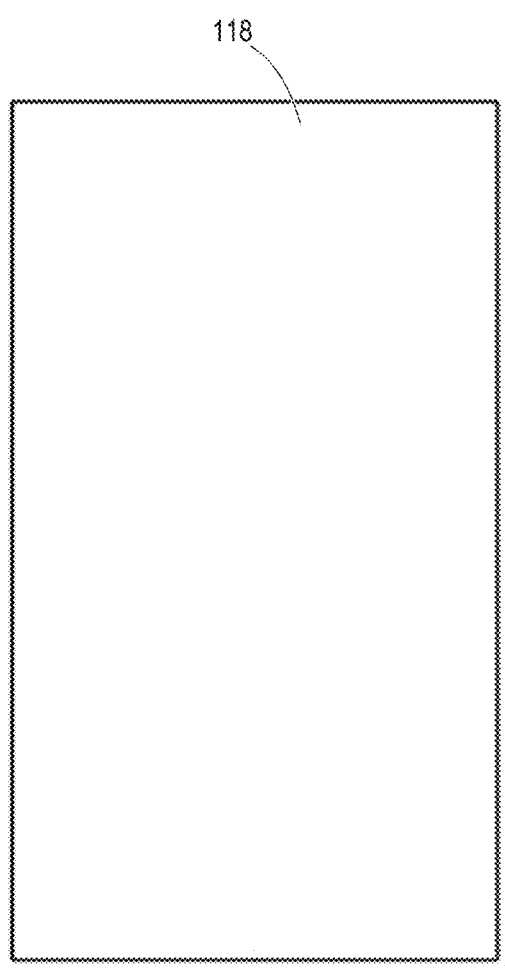
FIG. 41 illustrates a side view of a cup wrap of the cup cryostat of FIG. 1A, according to one or more embodiments.
Figure 43:
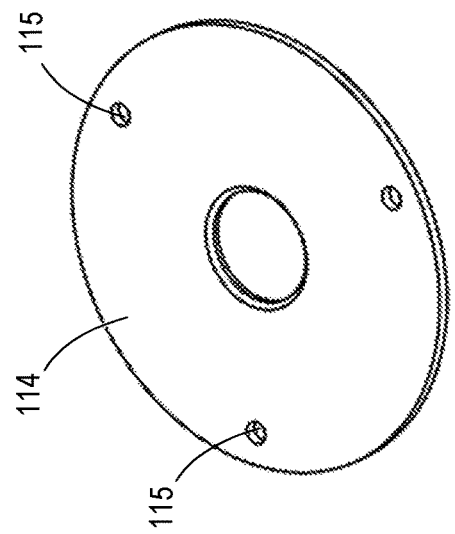
FIG. 43 illustrates an isometric view of a top plate of the cup cryostat of FIG. 1A, according to one or more embodiments.
Figure 46:
FIG. 46 illustrates a side detail view of the top plate of FIG. 45, according to one or more embodiments.
Figure 44:
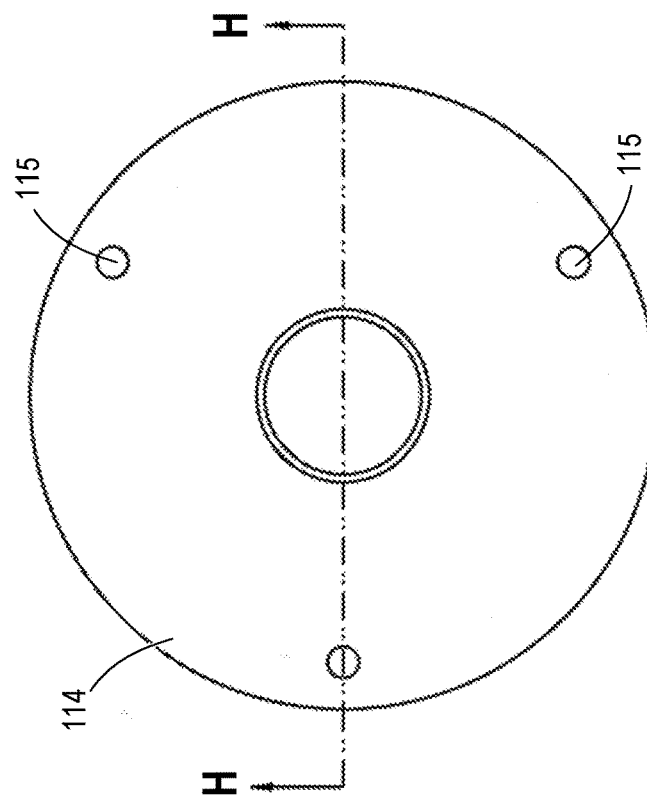
FIG. 44 illustrates a top view of the top plate of FIG. 43, according to one or more embodiments.
Figure 45:
FIG. 45 illustrates a side view of the top plate of FIG. 44 cutaway along line H-H, according to one or more embodiments.
Figure 48:
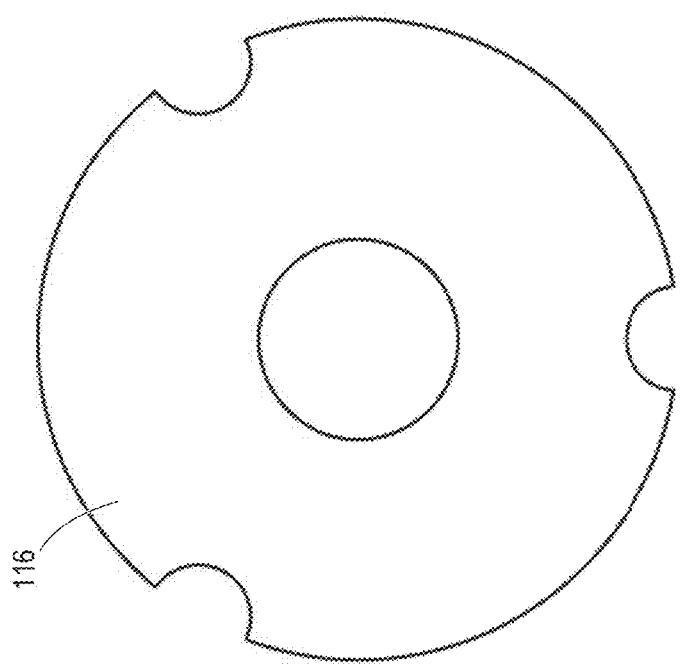
FIG. 48 illustrates a top view of the insulation apron of FIG. 47, according to one or more embodiments.
Figure 49:
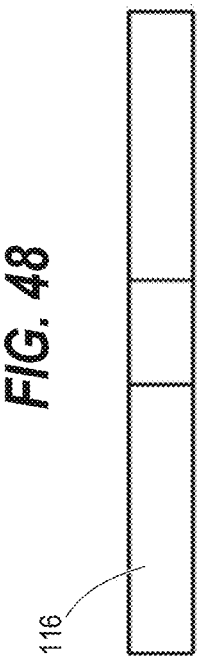
FIG. 49 illustrates a side detail view of the insulation apron of FIG. 47, according to one or more embodiments.
Figure 47:
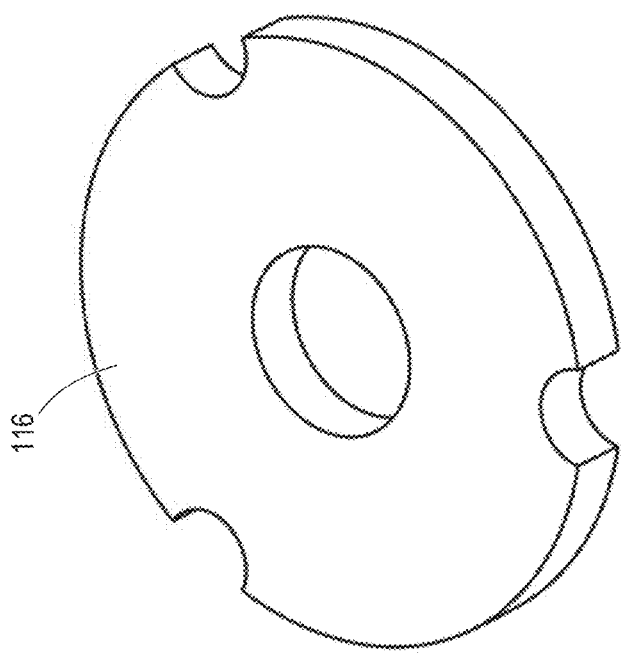
FIG. 47 illustrates an isometric view of an insulation apron of the cup cryostat of FIG. 1A, according to one or more embodiments.
Figure 51:
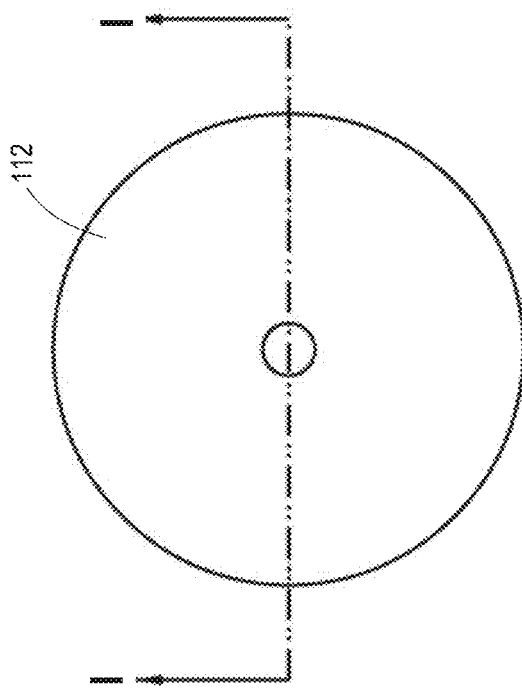
FIG. 51 illustrates a top view of the cap of FIG. 50, according to one or more embodiments.
Figure 52:
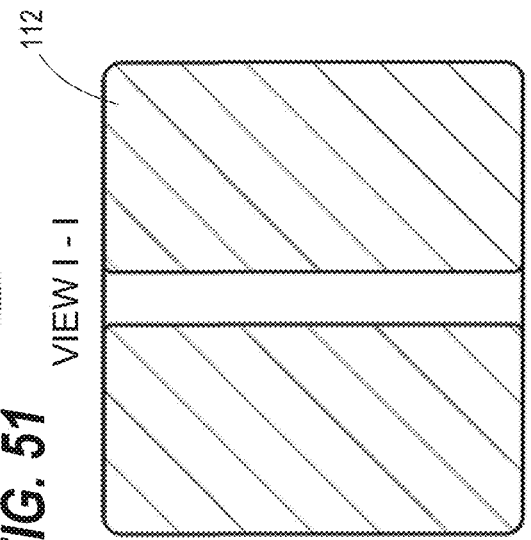
FIG. 52 illustrates a side view of the cap of FIG. 50 cutaway along line I-I, according to one or more embodiments.
Figure 50:
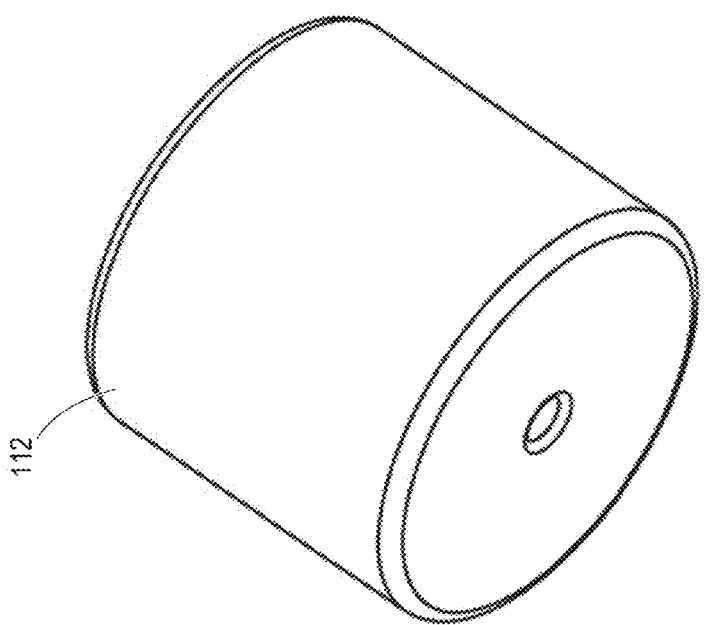
FIG. 50 illustrates an isometric view of a cap of the cup cryostat of FIG. 1A, according to one or more embodiments.

FIGS. 24-27 illustrate the upper heater plate 176 having three parallel grooves 188 for receiving thermocouples 186 (See FIGS. 10-11). FIGS. 28-29 illustrate the lower heater plate 172 having a recess 190 for electrical connections to the electric heater 174 (FIG. 9A). The recesses shown ensure flatness of the heat assembly which ensures flatness of the test specimen. FIGS. 30-32 illustrate G10 outer tube 152 having two top holes 192 annularly spaced by 90° and three bottom holes 194 annularly spaced by 120°. FIGS. 33-34 illustrate G10 inner tube 154. The small hole (0.042 inch dia.) on the side is for a temperature sensor T8 that goes into the boiloff flow stream. FIGS. 35-36 illustrates the G10 top centering ring 156. FIGS. 37-38 illustrate the G10 bottom centering ring 158. There are four small holes (0.042 inch dia.) for the four liquid level temperature sensors (T4, T5, T6, and T7). These small holes are sized for 30-gauge wire pairs and are sealed with a drop of high grade feedthrough epoxy. FIGS. 39-40 illustrates the cold plate 166. These three recess holes (0.089 inch dia.) are for up to three cold plate temperatures (T1, T2, and T3). After inserting the thermocouple wire pair (Type E, 30 gauge), they are sealed/potted with a drop of high grade feedthrough epoxy. Flatness and uniformity of surface finish of this copper disk is essential for both test specimen fit-up on the outside (lower surface) and the repeatability of boiling fluid heat transfer on the inside (upper) surface. The surfaces of the copper disk were polished to an RMS surface finish of less than 10 micro-inch. The flatness is 0.250 inch thickness+/−0.002 (maximum). FIGS. 41-42 illustrate the cup wrap 118. FIGS. 43-46 illustrates the top plate 114. FIGS. 47-49 illustrate the fiberglass insulation apron 116. FIGS. 50-52 illustrate the cap 112. FIGS. 53-54 illustrate the inner sponge ring 160. FIGS. 55-56 illustrate the outer sponge ring 161. Although in some embodiments, there will only be a single sponge ring rather than an inner and outer sponge ring. FIGS. 57-59 illustrate the spring housing 134. The compression loading spring is located in the spring housing 134. Different springs can be substituted for more or less compressive force onto the test specimen. Only hand-tightening is required to easily and repeatably bottom out the spring within the housing. The spring then maintains the same force on the specimen through all thermal cycles (hot/cold operations) during normal use of the Macroflash. This feature is incredibly important to obtain reproducible test results as the thermal conductivity through materials can change drastically in accordance with the variations in thermal contact/resistance.

Figure 60:
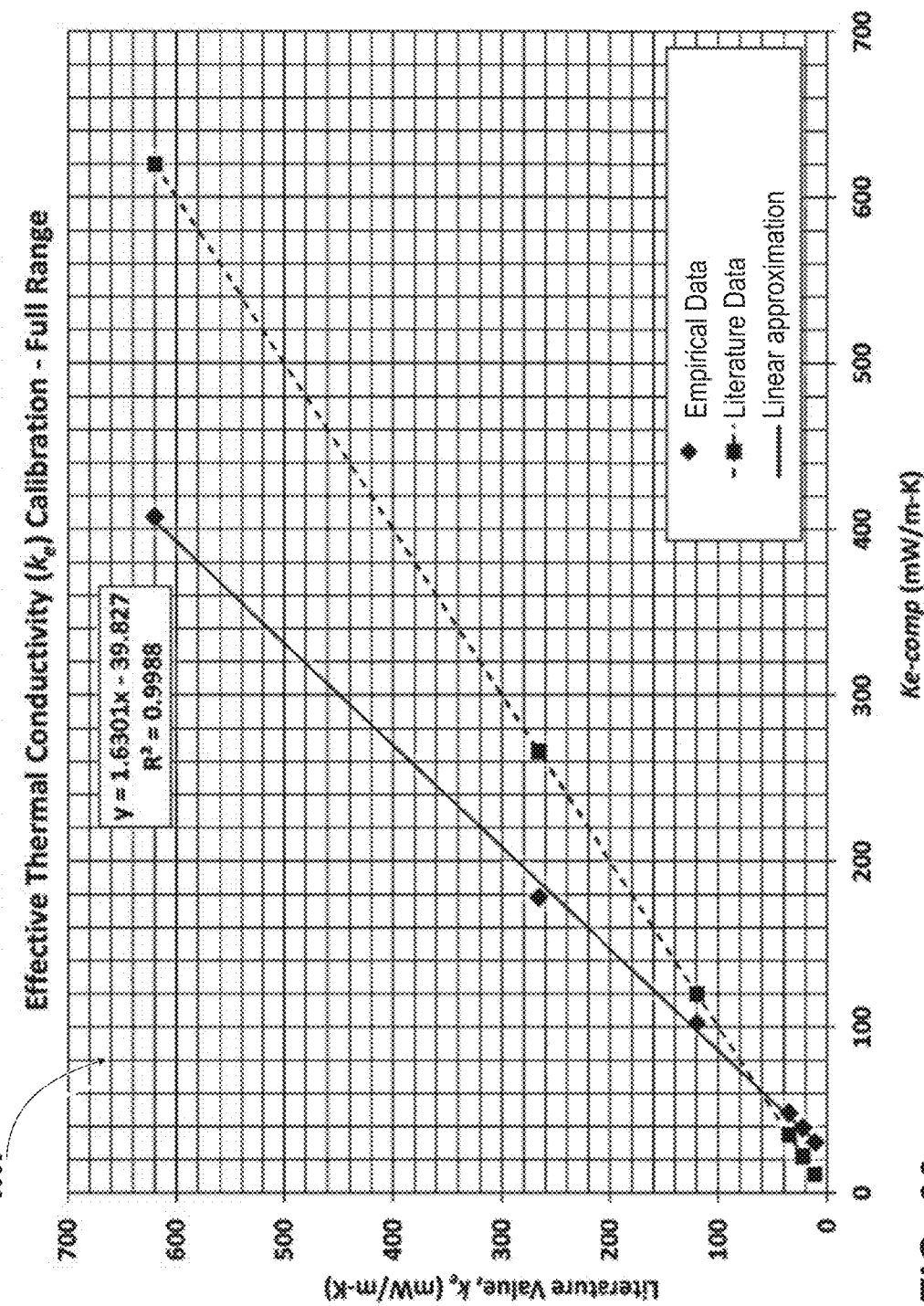
FIG. 60 illustrates a graphical plot of a calibration curve of the testing system of FIG. 1A, according to one or more embodiments.
Figure 61:
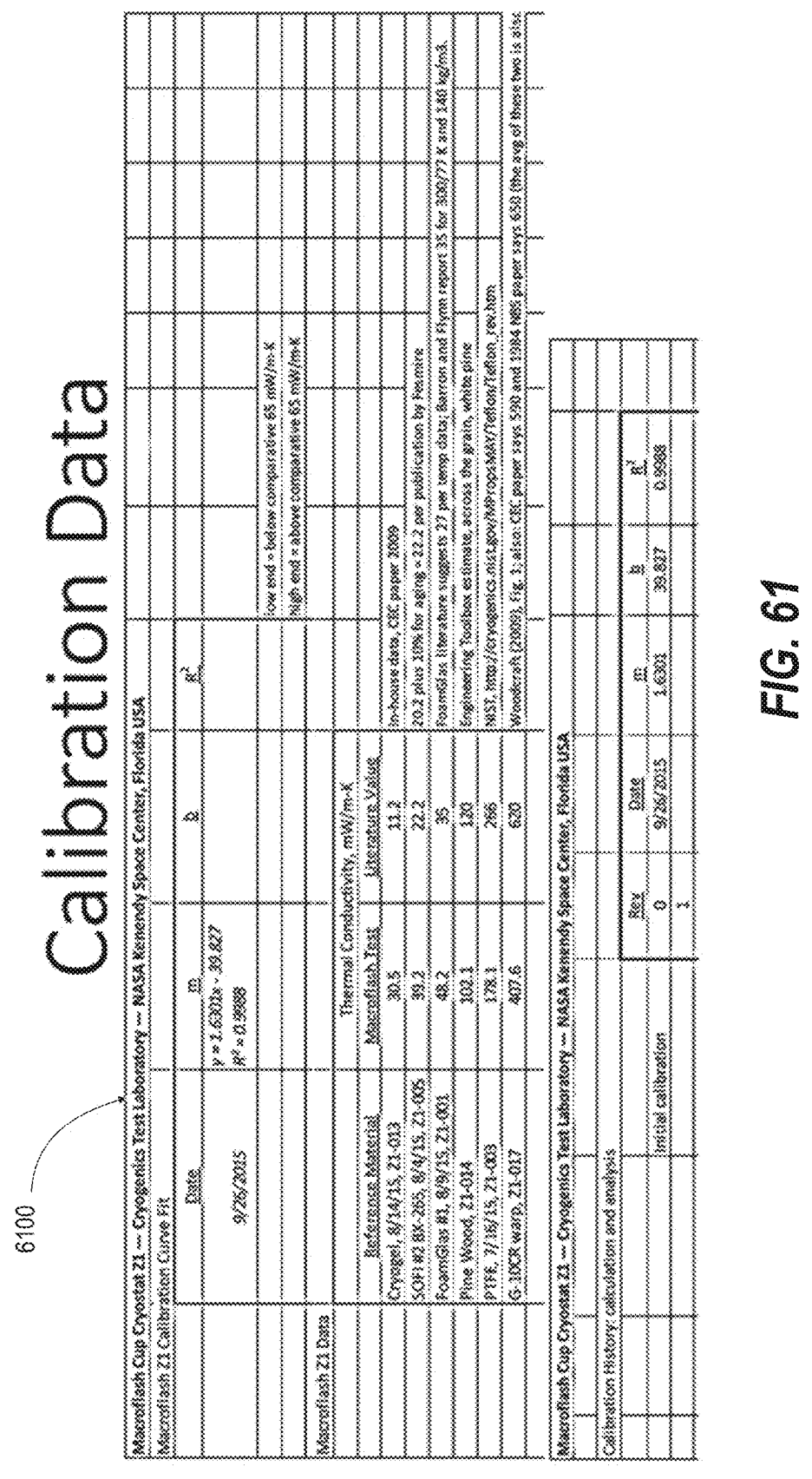
Figure 62:
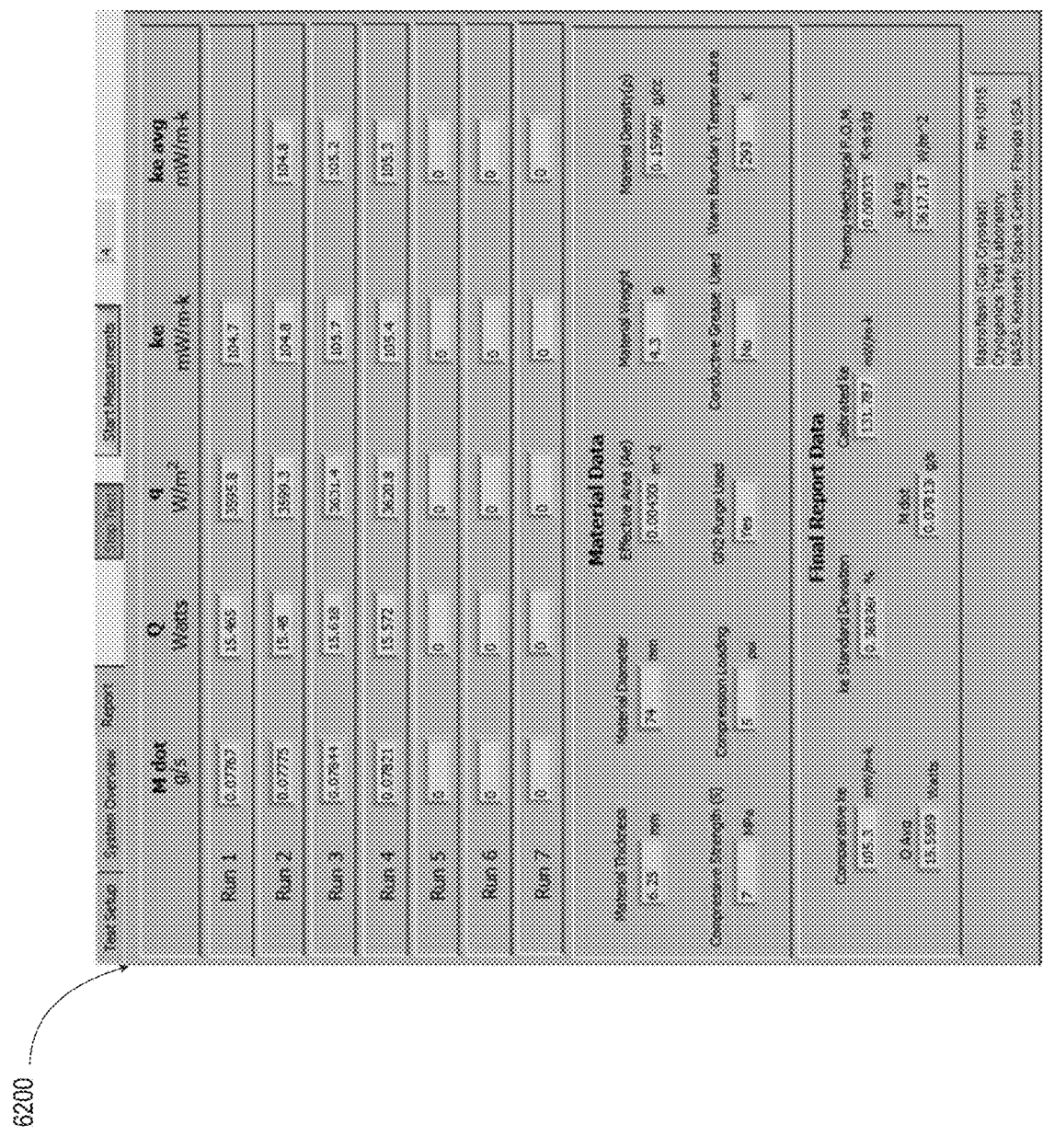
FIG. 62 illustrates a graphical depiction of tabular test results, according to one or more embodiments.
Figure 63:
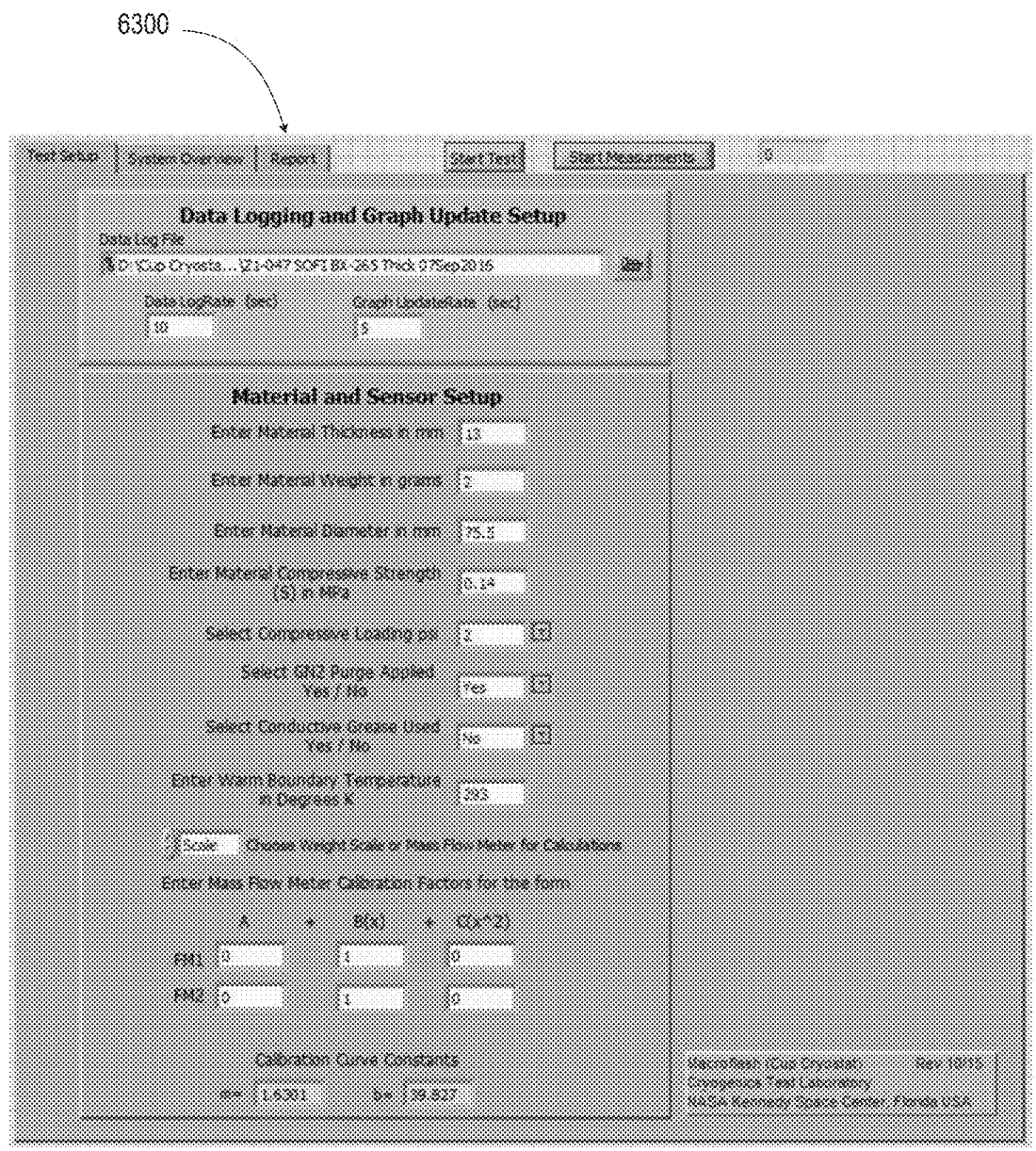
FIG. 63 illustrates a graphical setup interface that is presented by a graphical user interface (GUI) of the cup cryostat of FIG. 1A, according to one or more embodiments.
Figure 64:
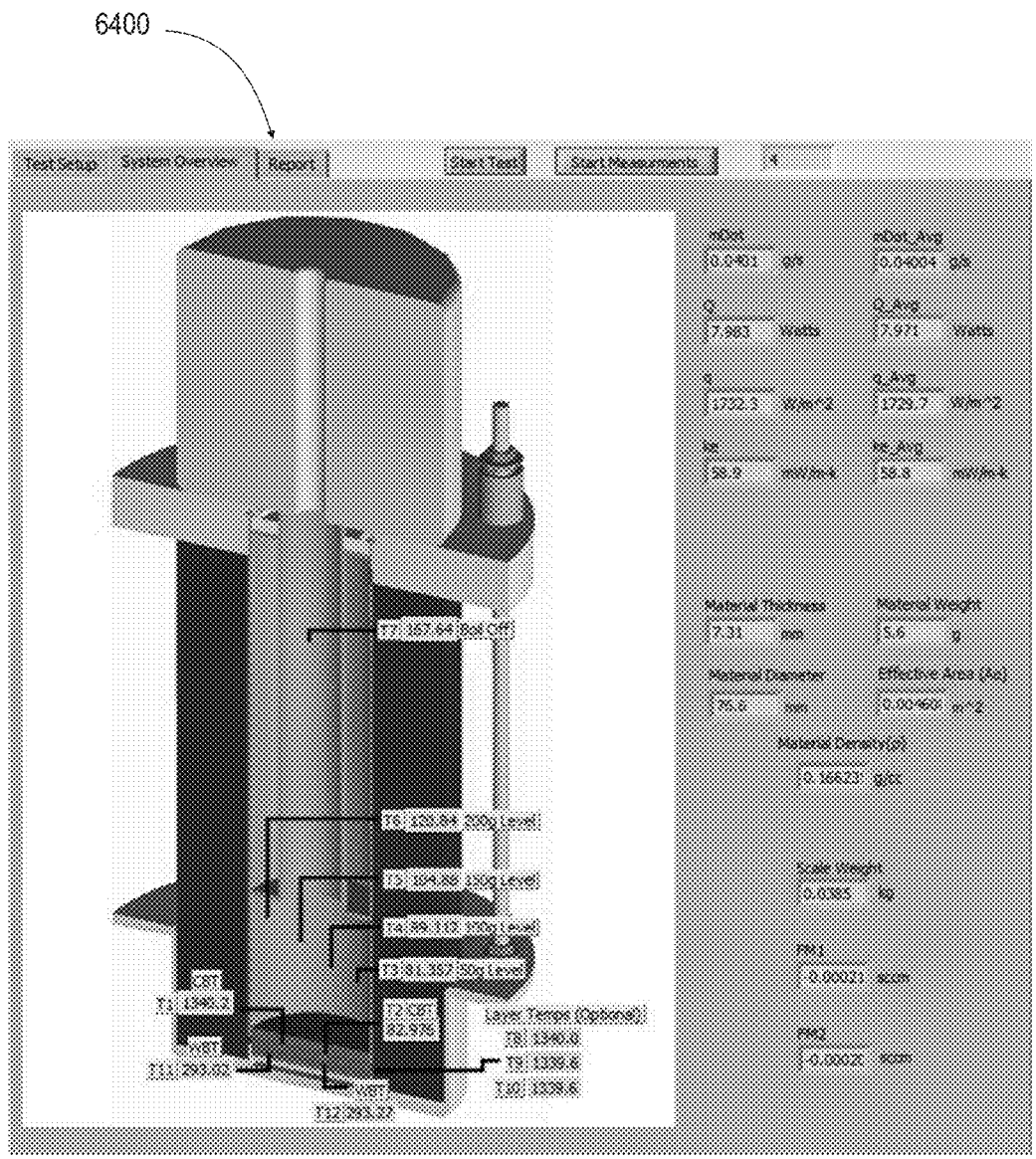
FIG. 64 illustrates a graphical setup depiction that is presented by the GUI of the cup cryostat of FIG. 1A, according to one or more embodiments.

FIG. 60 illustrates a graphical plot 6000 of the current calibration curve and FIG. 61 illustrates a table 6100 of an example of the application of the calibration data. Results of calibration testing are a straight line with a regression squared of 0.999 which is quite remarkable. FIG. 62 illustrates a graphical end results table 6200 that is presented by the GUI 110 of the cup cryostat 102 (FIG. 1A). FIG. 63 illustrates a graphical setup interface 6300 that is presented by the GUI 110 of the cup cryostat 102 (FIG. 1A). FIG. 64 illustrates a graphical setup depiction 6400 that is presented by the GUI 110 of the cup cryostat 102 (FIG. 1).

Figure 65:
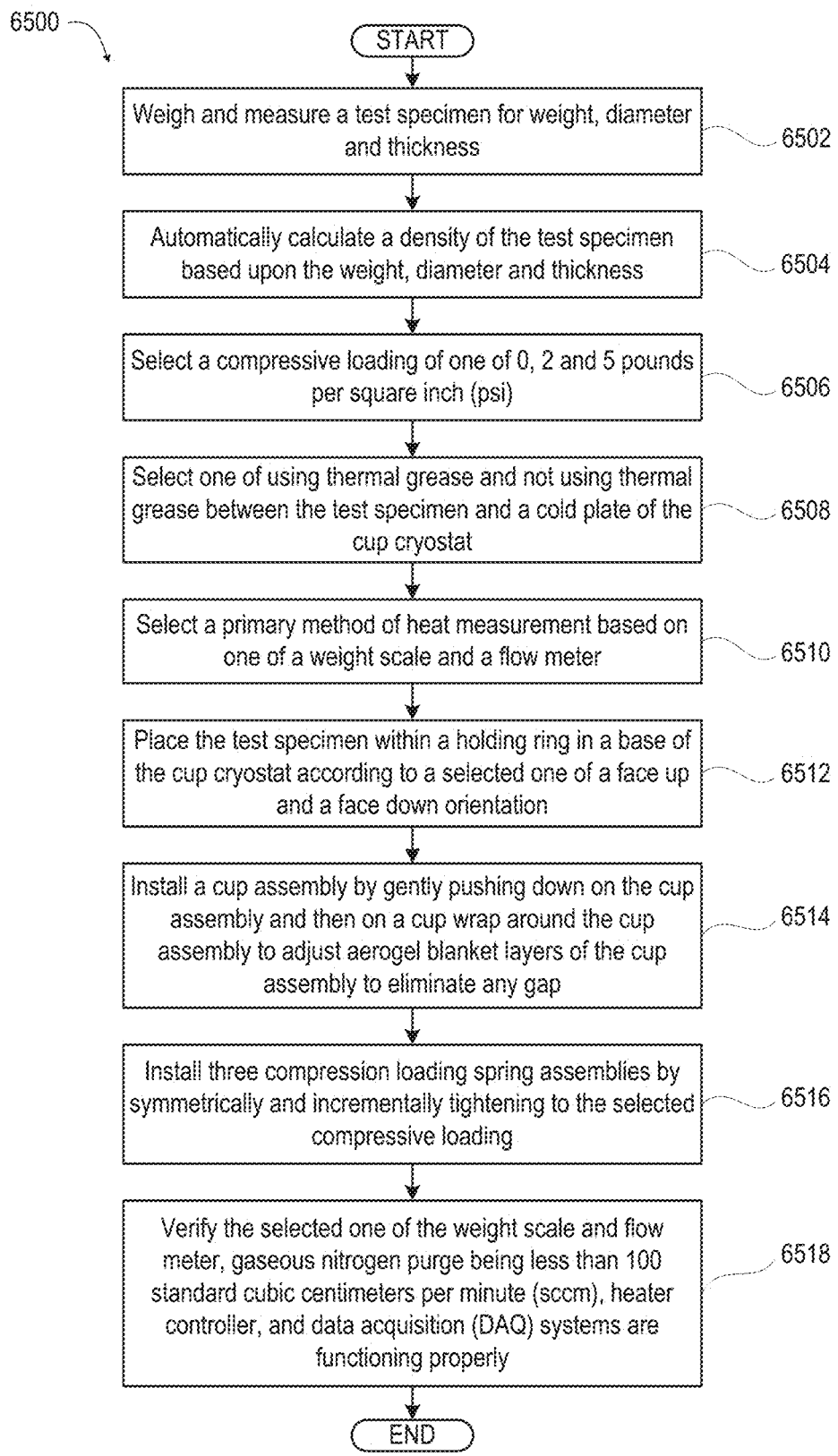
FIG. 65 illustrates a flow diagram of a method of preparing a test specimen for thermal testing in a cup cryostat, according to one or more embodiments.

FIG. 65 illustrates a method 6500 of preparing a test specimen for thermal testing in a cup cryostat. In one or more embodiments, the method 6500 includes weighing and measuring a test specimen for weight, diameter, and thickness (block 6502). Method includes automatically calculating a density of the test specimen based upon the weight, diameter, and thickness (block 6504). Method 6500 includes selecting a compressive loading of one of 0, 2, and 5 pounds per square inch (psi) (block 6506). Method 6500 includes selecting one of using thermal grease and not using thermal grease between the test specimen and a cold plate of the cup cryostat (block 6508). Method 6500 includes selecting a primary method of heat measurement based on one of a weight scale and a flow meter (block 6510). Method 6500 includes placing the test specimen within a holding ring in a base of the cup cryostat according to a selected one of a face up and a face down orientation (block 6512). Method 6500 includes installing a cup assembly by gently pushing down on the cup assembly and then on a cup wrap around the cup assembly to adjust aerogel blanket layers of the cup assembly to eliminate any gap (block 6514). Method 6500 includes installing three compression loading spring assemblies by symmetrically and incrementally tightening to the selected compressive loading (block 6516). Method 6500 includes verifying the selected one of the weight scale and flow meter, gaseous nitrogen purge being less than 100 standard cubic centimeters per minute (sccm), heater controller, and data acquisition (DAQ) systems are functioning properly (block 6518).

Figure 66:
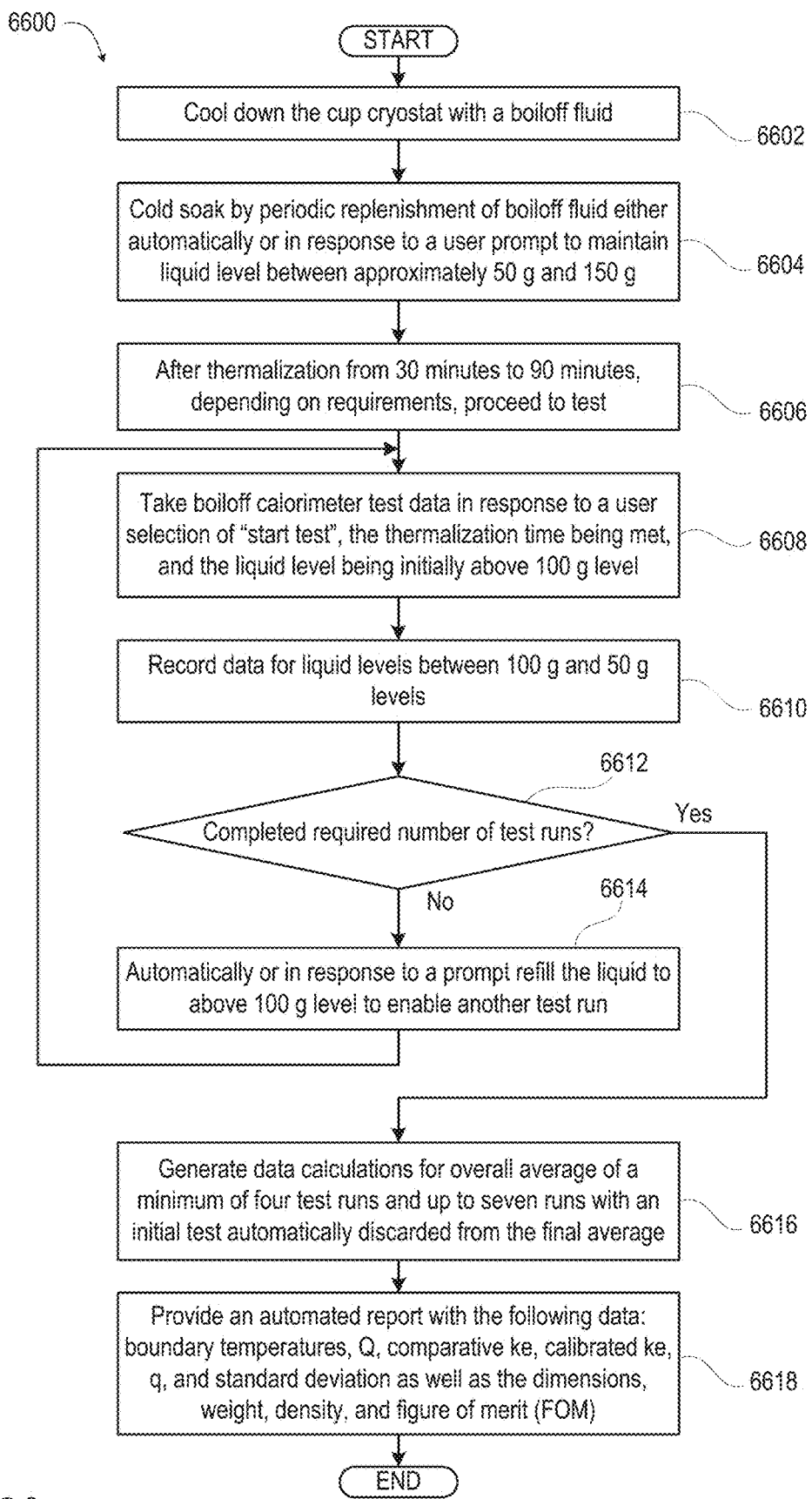
FIG. 66 illustrates a flow diagram of a method of performing a thermal test using a cup cryostat, according to one or more embodiments.

FIG. 66 illustrates a method 6600 for thermally testing a test specimen using a cup cryostat. In one or more embodiments, the method 6600 includes cooling down the cup cryostat with a boiloff fluid (block 6602). Method 6600 includes cold soaking by periodic replenishment of boiloff fluid either automatically or in response to a user prompt to maintain liquid level between approximately 50 g and 150 g (block 6604). Method 6600 includes, after thermalization from 30 minutes to 90 minutes, depending on requirements, proceeding to test (block 6606). The required stabilization time primarily depends on the overall thermal resistance (combination of thickness and thermal conductivity) of the test specimen; a higher thermal resistance takes a proportionally longer stabilization time, and vice versa. The stabilization phase can be extended indefinitely, as needed, without adverse effect. Thermalization has three parts: (1) "charging" of the aerogel blanket/aerogel bulk fill of the cup assembly by the adsorption of air, (2) establishing the temperature difference across the test specimen (which may be simple isotropic, or complex with many layers), and (3) thermal equilibrium of the blanket edge and insulation ring interface surrounding the test specimen. Method 6600 includes taking boiloff calorimeter test data in response to a user selection of "start test," the thermalization time being met, and the liquid level being initially above 100 g level (block 6608). Method 6600 includes recording data for liquid levels between 100 g and 50 g levels (block 6610). Method 6600 includes determining whether a required number of test runs have been completed (decision block 6612). In response to determining that the required number of test runs have not been completed in decision block 6612, method 6600 includes automatically, or in response to a prompt, refilling the liquid to above 100 g level to enable another test run (block 6614). Then method 6600 returns to block 6608. In response to determining that the required number of test runs have been completed in decision block 6612, Method 6600 includes generating data calculations for the overall average of a minimum of four test runs and up to seven runs with an initial test automatically discarded from the final average (block 6616). In Method 6600 providing an automated report with the following data: boundary temperatures, Q, comparative $k_e$, calibrated $k_e$, q, and standard deviation as well as the dimensions, weight, density, and figure of merit (FOM) (block 6618).

The Macroflash cup cryostat 102 (FIG. 1A) has a unique feature that the calibration curve has a cross-over with the ideal (or absolute) curve. This cross-over, at approximately 60 mW/m-K, means that the instrument could potentially be optimized to produce absolute values of thermal performance at points above this value by steering the upper end of the curve closer to the ideal. At higher heat flow rates (Q), that is, those that correspond to effective thermal conductivity ($k_e$) above about 60 mW/m-K, the convection of the boiloff vapor as it exits the apparatus produces a refrigeration effect. The boiloff gas exits the lower cup and enters the concentric tube and flows upward. The convective refrigeration effect is controlled by the combination of the concentric tube design and the surrounding bulk-fill insulation between the outer tube and the concentric tube. This design combination provides the repeatability and the range of heat measurement. This feature enables the possibility for an absolute measurement (above the heat flow corresponding to 85 mW/m-K) but it also enables the basic capability of testing over such a wide range of thermal performances from plastics and ceramics and conductive materials, too, as well as nonconductive materials such as aerogels and other super insulators.

The instrument is the comparative type of thermal performance measurement and therefore calibration against reference materials is essential. Detailed calibration work using specific prepared specimens of cellular glass (e.g., FoamGlas by Pittsburgh Corning, or equivalent), polyurethane foam, Teflon PTFE, aerogel blankets (e.g., Cryogel by Aspen Aerogels), balsa wood, and other materials has been produced and is being used for the ongoing work in the testing of various materials. This thermal conductivity data can help provide the technical foundation for future ASTM standards, as motivated by market demands. The Macroflash can test materials from foams to powders; from homogeneous, isotropic materials to highly anisotropic, layered composites; and from aerogel super insulators to plastics, glasses, or even metals. It is a direct measure of thermal energy unlike most all other commercial instruments which are indirect measures (i.e., electrical power and temperature sensors) with their concomitant limitations in types of materials, test environments, and range of measurement. No commercial instrument comes close to its wide range of thermal conductivity and heat flux. Repeatability is typically better than 1% and accuracy better than 5%. These data have been demonstrated through tests of hundreds of different materials and thermal insulation systems.

Specific Embodiments Testing

In a previous version of the cup cryostat, LabView recorded test time [s] with (a) $T_1$ [K] for warm boundary temperature (WBT) using Type E thermocouple; (b) $T_2$ [K] for Cup surface temperature at ½" height using Type E thermocouple; (c) $T_3$ [K] for Cup surface temperature at 3" height using Type E thermocouple; (d) $T_4$ [K] for Boiloff gas temperature using Type E thermocouple; and (e) Weight scale [kg]. Graphs were presented on Labview: (1) temperatures; and (2) weight scale. Labview merely presented the raw data without performing calculations. Text file was copied and pasted onto an Excel spreadsheet file, RawData tab. Six columns of data were then copied and pasted onto the Data_Test tab. The test specimen name, test date, thickness, and mass were entered. Excel calculated: (a) Boiloff Flow Rate [g/s]; (b) Volumetric Flow Rate [sccm]; (c) Heat Flow Rate (Q) [W]; (d) Heat Flux (q) [W/m2]; and (e) Effective Thermal Conductivity ($k_e$) [mW/m-K]. Excel automatically charted a graph of all the test runs. The Analysis tab provided automated analysis of the multiple test runs by calculating the averages and percentage standard deviations for Boiloff Flow Rate, Q, $k_e$, and q. From a standard test series of four runs, the analysis dropped the first run and averaged the latter three.

In an improved version of the testing system 100 (FIG. 1A), Labview records the test times and the data received from the following sensors as depicted in FIG. 1B: (a) $T_1$ [K] for Cold boundary temp (CBT) using Type E thermocouple; (b) $T_2$ [K] for CBT using Type E thermocouple; (c) $T_3$ [K] for LN2 level 50 g Type E thermocouple; (d) $T_4$ [K] for LN2 level 100 g using Type E thermocouple; (e) $T_5$ [K] for LN2 level 150 g using Type E thermocouple; (f) $T_6$ [K] for LN2 level 200 g using Type E thermocouple; (g) $T_7$ [K] for Boiloff gas temp Type E thermocouple; (h) $T_8$ [K] for Layer temperature (LT), optional, using Type E thermocouple; (i) $T_9$ [K] for Layer temperature (LT), optional, using Type E thermocouple; (j) $T_{10}$ [K] for Layer temperature (LT), optional, using Type E thermocouple; (k) $T_{11}$ [K] for Warm boundary temperature (WBT) using Type E thermocouple; (l) $T_{12}$ [K] for Warm boundary temp (WBT) using Type E thermocouple; (m) $T_{12h}$ [K] (not recorded) transmitted to heater controller using Type E thermocouple; (n) Weight scale [kg] Boiloff–mass flow; (o) Flow Meter 1 [sccm] for Boiloff–volumetric flow, optional for meter-kilogram-second (MKS) with a, b, c coefficients; and (p) Flow Meter 2 [sccm] for Boiloff–volumetric flow, optional, for MKS with a, b, c coefficients.

Graphs that are presented on Labview include: (1) Temperatures (near room temperature); (2) temperatures (cryogenic temperatures); (3) weight scale; and (4) flow meter. Calculations that are depicted on LabView include: (1) Input thickness (t) in [mm]; (2) Calculated mass flow [g/s], (3) calculated heat flow rate (Q) [W], (4) calculated heat flux (q) [W/m2], and (5) calculated effective thermal conductivity ($k_e$) [mW/m-K]. It should be noted that mass flow is determined from the weight scale and/or the volumetric flow meter.

For additional analysis, data from LabView can be migrated to Excel. Excel data file is copied and pasted onto the Excel file, RawData tab. Necessary columns of temperature data are then copied and pasted onto or automatically retrieved into the Data_Test tab. The test specimen name, test date, thickness, and mass are entered. Excel calculates: (a) Boiloff Flow Rate [g/s]; (b) Volumetric Flow Rate [sccm]; (c) Heat Flow Rate (Q) [W]; (d) Heat Flux (q) [W/m2]; (e) Effective Thermal Conductivity ($k_e$) [mW/m-K]. Excel automatically charts a graph of all the test runs. The Analysis tab provides automated analysis of the multiple test runs by calculating the averages and percentage standard deviations for Boiloff Flow Rate, Q, $k_e$, and q. From a standard test series of four runs, the analysis drops the first run and averages the latter three.

Production Macroflash instruments (four each) were made according to the following fabrication notes and assembly sequence. First, basic Cold Mass #1 was assembled. The G10 tube with the copper disk was attached by epoxy (e.g., Stycast 2850FT with catalyst 23LV). The epoxy was applied with a syringe in an even bead around the inside circumference of the lower edge of the G10 tube. The epoxy was done on a flat Teflon surface and required 24-hour minimum cure time. The assembly was placed in an upright position to allow the epoxy to flow downward and into the chamber of the copper disk to produce an even, complete glue joint.

Second, cold shock of Cold Mass #1 was done by performing five complete cold shocks including warm shocks of hot water under faucet for warm ups. This constituted a severe thermal shock that produced a slight cracking sound at one point during the first cool down, but none after. Results were no cracks and no leaks. The epoxy joint worked as designed.

Third, conducted film boiling experiments. Copper disk (3" dia. by ¼" thick) with 4" tall G-10 tube were attached by epoxy (two each). Different surface finishes including polished with 5000 grit paper, sandblasted, and Teflon grease coating were evaluated with respect to cool down time with LN2. A surface finish, both sides of <10 micro-inches RMS was selected along with a flatness target of better than +/−0.002 inches for the 0.250 inch thick copper cold plate.

Fourth, cold shock of remaining three cold mass basic assemblies as previously described. Epoxy was performed as previously described. Cool down times were from 2'-30" to 2'-40". Five thermal shocks completed with no leaks and no cracks.

Fifth, sequence of inner tube assembly of the inner G10 tube plus upper spacer ring and lower spacer ring was performed: (1) drill hole for T99 in inner tube ((0.042" diameter), (2) drill holes (0.042" diameter) in lower spacer ring (four each, 90° apart) for four LN2 temp sensors, (3) bevel spacer rings, (4) epoxy spacer rings to inner G10 tube (place in vertical position and keep upright on level Teflon surface with aluminum tape on underside of upper spacer ring to hold in correct position to ensure components are lined up correctly, then remove tape after curing); (5) install five thermocouples on the inner tube assembly and bundle wires very neatly together for future routing through outer G10 tube; seal lead wire holes with generous drop of two part epoxy (e.g., Devcon 5-minute epoxy or equivalent); give each pair of lead wires about 1" length of relief near hole and fix with bead of epoxy; secure wires with tie wraps and aluminum tape in crisp and detailed fashion; and (6) checkout thermocouples for accurate (similar) measurement using LN2. Bevel spacer rings for both precision fit and good glue joint. For both upper spacer ring and lower spacer ring, bevel inner/top edge and bevel outer/bottom edge. Use file and then 320 grit sand paper to produce approximate ¹⁄₁₆" bevel on a 45° angle.

Eliminate all sharp edges on G10 finishing of rings and tubes. Sand to precision fit-up (slip fit) with 320 grit sandpaper and hand file as necessary. Bevel in locations shown for epoxy joints.

Use high grade feedthrough epoxy system (Stycast 2850FT and catalyst 23LV, or equivalent, per manufacturer's instructions) on inner tube assembly to outer tube assembly. Verify thermocouples are checked out and lead wires are properly secured. Verify proper slip fit of inner tube assembly within outer tube assembly.

Epoxy lower spacer ring to inner tube on flat surface. Epoxy upper spacer ring to inner tube while loosely inserted within outer tube. Epoxy inner tube assembly to outer tube: Coat inside of outer tube at lower end with a ½" band of epoxy just above the joint location. Use small, long handled "paint brush" that is made from foam swab and aluminum welding rod for lower position. The epoxy adhesive permanently joins the upper spacer ring and the lower spacer ring to the inner diameter of the first tube and the outer diameter of the second tube. The epoxy adhesive hermetically seals the test apparatus so that it is resistant to thermal shocks between temperatures of −321 degrees F. and 300 degrees F.

Position assemblies partway together and route thermocouple wire bundle through hole in outer tube. Intermediate positioning of assemblies with lower epoxy already included: ensuring not to push in too far to avoid crushing the thermocouples inside. Epoxy upper spacer ring. Coat inside of outer tube at upper end with a ½" band of epoxy just above the joint location. Use syringe to apply bead of epoxy. Turn upside down and leave final assembly on flat surface of Teflon to cure.

Sixth, verify cold mass assemblies in work. Check out steps and tests: (1) Continuity check, all thermocouples checkout: 50 to 53 ohms; (2) Leak check with LN2 shot (put in shot of LN2 then capped with plug with small hole to check slight pressure buildup; (3) Aerogel beads (e.g., Nanogel by Cabot Corp., or equivalent) installed and holes plugged with Cryolite fiberglass and taped over with aluminum tape; (4) Installed warm-up heater 1" away from bottom edge; and (5) Verify routed thermocouple wires and heater wires are separate and not crossing each other; ensure wires are straight, even, and parallel along the G10 tube outer surface to help make even aerogel blanket wrap and butt joints later.

By virtue of the foregoing, an optimized flat plate thermal testing system is realized. The present invention works because of a balance of design. The design configuration, the geometric proportions, the materials of construction, and the masses of each piece, etc., contribute to overall accuracy and repeatability of the test results. The height of the cup chamber compared to the overall diameter and height are important. The amounts of liquid within the cup chamber were very carefully worked out over many years. For the illustrative 3-inch diameter unit, as built, the workings are between 50 g and 150 g, as described. For larger units, these dimensions are proportionately more. The diameter of the base in proportion to the cup diameter and heater plate and test specimen is important. The aerogel insulation wraps surrounding the overall cup assembly and the aerogel insulation apron rings surrounding the heater plate/test specimen are crucial in the design configuration, the materials type, the number of layers, the individual layer thicknesses, and so on. The system is optimized by minimizing the parasitic heat flows (heat flowing anywhere except through the thickness of the test specimen) and then, furthermore, ensuring that these same parasitic heat flows are highly consistent and repeatable. Thus, the procedure for testing is very highly repeatable from test to test as well as different types of materials such as rigid or soft materials. The testing works for materials of different thermal conductivity as well as for different specimen thicknesses.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device, or component thereof to the teachings of the disclosure without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc., do not denote any order or importance, but rather the terms first, second, etc., are used to distinguish one element from another.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the disclosure in the form disclosed. Many modifications and variations will be apparent to those of ordinary skill in the art without departing from the scope of the invention. The described embodiments were chosen and described in order to best explain the principles of the invention and the practical application, and to enable others of ordinary skill in the art to understand the invention for various embodiments with various modifications as are suited to the particular use contemplated.

We claim:

1. A test apparatus for evaluating thermal properties of a test specimen, the test apparatus comprising:
   a base comprised of a base cup closed along a bottom edge by a base lower plate, including a bottom top plate extending radially and outwardly from the base cup to present a bottom plurality of holes;
   a top plate having a central passage and a top plurality of holes that correspond respectively to the bottom plurality of holes of the bottom top plate;
   a heater assembly supported on a lower heater plate, the heater assembly positioned atop the base lower plate;
   a cold plate positioned above the heater assembly defining a test specimen cavity between the heater assembly and the cold plate;
   a first tube having an open top extending from the central passage to the cold plate, forming a cold cup atop the cold plate to receive a quantity of liquid;
   a compression assembly comprising a plurality of longitudinally-adjustable, threaded rods, each threaded rod attachable respectively between the top plurality of holes and the bottom plurality of holes, wherein a height of the test specimen cavity is defined by inserting the plurality of threaded rods through the plurality of holes and attaching a plurality of top nuts and a plurality of bottom nuts to the plurality of threaded rods;
   a specimen holder placed adjacent to the heater assembly that annularly corresponds to the first tube;
   a cup wrap that laterally surrounds and insulates the first tube; and
   one or more annular centering rings placed in the base to correspond to and compressibly receive an underside of the cup wrap.

2. The test apparatus of claim 1, further comprising one or more spacers selectably insertable into the test specimen cavity to center the test specimen or to facilitate a selected one of a granular and powder type test specimen placed in the test specimen cavity.

3. The test apparatus of claim 2, wherein the one or more spacers have a vertical height that is not more than 20% of the diameter of the test specimen cavity.

4. The test apparatus of claim 1, further comprising a layer of thermally conductive grease coating an undersurface of the cold plate to contact a test specimen.

5. The test apparatus of claim 1, wherein the cup wrap comprises an aerogel blanket wrap that is compressed by engaging the compression assembly, the aerogel blanket wrap adsorbing air from the environment during cool down to create stable thermalization for testing.

6. The test apparatus of claim 5, wherein the aerogel blanket wrap comprises: (i) insulation blanket layers that engage a top surface of a top-most centering ring to form a tortuous air path to mitigate thermal heat transfer from lateral air movement and comprises (ii) vapor barrier layers to create thermal stability of the cup wrap in the lateral direction through the insulation blanket layers and minimize the time to reach thermalization with the ambient environment, wherein the vapor barrier layers terminate above a bottom portion of the insulation blanket layers to enable air adsorption from the test specimen cavity and to enable compression of the aerogel blanket wrap.

7. The test apparatus of claim 1, further comprising:
a series of vertically-spaced temperature sensors positioned inside the cold cup that determine an approximate level of liquid in the cold cup based on the temperature readings among the vertically-spaced temperature sensors.

8. The test apparatus of claim 7, further comprising a personal computer that receives a prompt and presents a human-perceptible alert to refill the cold cup at a specified level of liquid.

9. The test apparatus of claim 7, further comprising an automated liquid dispenser that receives the prompt and dispenses a quantity of liquid into the cold cup in response to the prompt.

10. The test apparatus of claim 1, wherein the specimen holder separates the heater assembly from the one or more annular centering rings, the specimen holder having an upwardly presented chamfered edge on an outer diameter to mitigate thermal conduction from the heater assembly to the cold cup.

11. The test apparatus of claim 1, further comprising:
a second tube concentrically received in an upper portion of the first tube and having a bottom centering ring affixed to the inner diameter of the first tube and the outer diameter of the second tube to define a top of the cold cup, the second tube sized to receive the quantity of liquid and provide a path for boiloff gas from the quantity of liquid;
insulation material placed in an annular space between the first and second tubes; and
a top centering ring affixed to the inner diameter of the first tube and the outer diameter of the second tube to hold the insulation material between the first and second tubes;
wherein the boiloff gas creates a convective refrigeration effect for heat flow rates (Q) corresponding to effective thermal conductivity ($k_e$) above approximately 60 mW/m-K that is controlled by respective dimensions of the first and second tubes and selected insulation material and enables testing over a wide range of thermal performances of a heat flux range of 80-1000 W/m$^2$.

12. The test apparatus of claim 11, wherein the first tube, second tube, top centering ring, and bottom centering ring are comprised of a glass fiber reinforced composite material for high mechanical strength and low thermal conductivity in all directions.

13. The test apparatus of claim 11, wherein the top centering ring and the bottom centering ring are permanently joined to the inner diameter of the first tube and the outer diameter of the second tube using an epoxy adhesive, wherein the test apparatus is hermetically sealed and resistant to thermal shocks between temperatures of −321 degrees F. and 300 degrees F.

14. The test apparatus of claim 11, wherein the insulation material is a breathable, super-hydrophobic, bulk-fill material comprising at least one of silica aerogel beads and silica aerogel granules.

* * * * *